United States Patent
Nitta et al.

(10) Patent No.: US 11,884,340 B2
(45) Date of Patent: Jan. 30, 2024

(54) STEERING CONTROL DEVICE

(71) Applicants: JTEKT CORPORATION, Kariya (JP); TOYOTA JIDOSHA KABUSHIKI KAISHA, Toyota (JP); DENSO CORPORATION, Kariya (JP)

(72) Inventors: Shingo Nitta, Anjo (JP); Takahiro Toko, Takahama (JP); Yoji Kunihiro, Susono (JP); Takahiro Kojo, Gotenba (JP); Hisaya Akatsuka, Kariya (JP)

(73) Assignees: JTEKT CORPORATION, Kariya (JP); TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 324 days.

(21) Appl. No.: 17/460,748

(22) Filed: Aug. 30, 2021

(65) Prior Publication Data
US 2022/0073134 A1    Mar. 10, 2022

(30) Foreign Application Priority Data

Sep. 7, 2020   (JP) ................. 2020-150050

(51) Int. Cl.
```
B62D 5/04      (2006.01)
B62D 6/10      (2006.01)
B62D 15/02     (2006.01)
B62D 6/00      (2006.01)
B62D 1/28      (2006.01)
```
(52) U.S. Cl.
CPC .......... *B62D 5/0463* (2013.01); *B62D 6/007* (2013.01); *B62D 6/008* (2013.01); *B62D 6/10* (2013.01); *B62D 15/025* (2013.01); *B62D 1/286* (2013.01)

(58) Field of Classification Search
None
See application file for complete search history.

(56) References Cited

U.S. PATENT DOCUMENTS

| | | | |
|---|---|---|---|
| 10,173,717 B2 * | 1/2019 | Tsubaki | B62D 5/0463 |
| 10,259,496 B2 * | 4/2019 | Talamonti | B62D 6/008 |
| 10,315,693 B2 * | 6/2019 | Mitsuishi | B62D 5/0463 |
| 10,538,268 B2 * | 1/2020 | Talamonti | B62D 15/0255 |
| 10,562,566 B2 * | 2/2020 | Kim | B62D 6/008 |
| 10,618,552 B2 * | 4/2020 | Tsubaki | B62D 5/0463 |

(Continued)

FOREIGN PATENT DOCUMENTS

| | | | | |
|---|---|---|---|---|
| CN | 104661895 B | * | 7/2016 | ........... B62D 5/0463 |
| CN | 105555643 B | * | 1/2018 | ........... B62D 5/0463 |

(Continued)

OTHER PUBLICATIONS

Jan. 25, 2022 Search Report issued in European Patent Application No. 21194016.8.

*Primary Examiner* — Kevin R Steckbauer
(74) *Attorney, Agent, or Firm* — Oliff PLC

(57) ABSTRACT

A steering control device includes: a first calculator configured to calculate, according to a turning state, a first control amount for causing a motor to generate an assistance force; a second calculator configured to calculate a second control amount for adapting an actual angle to a target angle that is convertible into a turning angle of a steering wheel and generated when a host control device intervenes in steering control; and a third calculator configured to calculate, according to the turning state, a third control amount for offsetting the second control amount when the host control device intervenes in steering control.

9 Claims, 11 Drawing Sheets

(56) References Cited

U.S. PATENT DOCUMENTS

| | | | |
|---|---|---|---|
| 11,014,606 B2 * | 5/2021 | Wu | B62D 15/025 |
| 11,034,381 B2 * | 6/2021 | Kim | B62D 5/0466 |
| 11,097,770 B2 * | 8/2021 | Minaki | B62D 5/0463 |
| 11,338,844 B2 * | 5/2022 | Kezobo | B62D 6/008 |
| 11,465,674 B2 * | 10/2022 | Kodera | B62D 5/0463 |
| 11,485,409 B2 * | 11/2022 | Kodera | B62D 15/027 |
| 2018/0201306 A1 * | 7/2018 | Tsubaki | B62D 1/286 |
| 2020/0298904 A1 * | 9/2020 | Kitazume | B62D 5/0463 |
| 2021/0061344 A1 * | 3/2021 | Kitazume | B62D 1/286 |
| 2022/0073134 A1 * | 3/2022 | Nitta | B62D 15/025 |
| 2022/0111891 A1 * | 4/2022 | Takeuchi | B60W 30/12 |
| 2023/0126269 A1 * | 4/2023 | Kim | B62D 15/021 701/23 |

FOREIGN PATENT DOCUMENTS

| | | | | |
|---|---|---|---|---|
| CN | 108297936 A | * | 7/2018 | B62D 1/28 |
| CN | 111315637 A | * | 6/2020 | B62D 5/0463 |
| CN | 109219553 B | * | 3/2021 | B62D 1/286 |
| CN | 113382906 A | * | 9/2021 | B62D 1/286 |
| CN | 111315637 B | * | 3/2022 | B62D 5/0463 |
| DE | 102019214446 A1 | | 3/2021 | |
| DE | 112019006831 T5 | * | 10/2021 | B62D 1/286 |
| EP | 2138380 A1 | | 12/2009 | |
| EP | 3321149 A1 | * | 5/2018 | B62D 1/286 |
| EP | 3453592 B1 | * | 2/2020 | B62D 1/286 |
| JP | 2015-020604 A | | 2/2015 | |
| JP | 2017-124667 A | | 7/2017 | |
| JP | 2018108750 A | * | 7/2018 | B62D 1/286 |
| JP | 6528910 B2 | * | 6/2019 | B62D 1/286 |
| JP | 6714116 B1 | * | 6/2020 | B62D 1/286 |
| JP | 2020125062 A | * | 8/2020 | B62D 1/286 |
| JP | 2021195086 A | * | 12/2021 | B62D 5/006 |
| WO | WO-2017213130 A1 | * | 12/2017 | B62D 1/286 |
| WO | WO-2019026895 A1 | * | 2/2019 | B62D 1/286 |
| WO | WO-2020161928 A1 | * | 8/2020 | B62D 1/286 |
| WO | WO-2021058405 A1 | * | 4/2021 | |

* cited by examiner

STEERING CONTROL DEVICE

CROSS-REFERENCE TO RELATED APPLICATION

This application claims priority to Japanese Patent Application No. 2020-150050 filed on Sep. 7, 2020, incorporated herein by reference in its entirety.

BACKGROUND

1. Technical Field

The disclosure relates to a steering control device.

2. Description of Related Art

For example, the control device of Japanese Unexamined Patent Application Publication No. 2015-20604 executes lane-keep control of causing a vehicle to travel along a lane and assistance control of assisting a driver in steering. The control device generates an assistance command for generating an assistance torque according to a steering torque. Further, the control device generates an adaptation command for generating an automated steering torque according to a target angle set by a host control device. Based on an additional value of the assistance command and the adaptation command, the control device controls electricity supplied to a motor.

When the driver's intervention in the lane-keep control is detected, the control device changes the ratio of the assistance torque relative to the automated steering torque so as to be higher when the degree of intervention is higher. The control device calculates an intervention coefficient according to the steering torque and varies an allowable range of the adaptation command according to the calculated intervention coefficient. As the value of the steering torque becomes larger, the intervention coefficient becomes closer to zero and the allowable range of the adaptation command becomes narrower. With the adaptation command that counteracts intervention steering thus restricted, the driver can easily operate the steering wheel.

SUMMARY

Recently, customer demand for steering control devices has been increasingly diversified based on the specifications of steering control devices or the specifications of vehicles to be equipped with a steering control device. To meet such demand, extensive research and development on the configuration of a steering control device are being conducted.

The disclosure can improve a steering feel that a driver experiences when performing intervention steering.

An aspect of the disclosure is a steering control device. The steering control device controls a motor that is a source of generation of an assistance force for assisting in turning a steering wheel. The steering control device includes: a first calculator configured to calculate, according to a turning state, a first control amount for causing the motor to generate the assistance force; a second calculator configured to calculate a second control amount for adapting an actual angle to a target angle that is convertible into a turning angle of the steering wheel and generated when a host control device intervenes in steering control; and a third calculator configured to calculate, according to the turning state, a third control amount for offsetting the second control amount when the host control device intervenes in the steering control.

When the driver turns the steering wheel while the host control device is intervening in steering control, the deviation of the actual angle from the target angle increases. To eliminate the increasing deviation, the second calculator calculates a second control amount having a larger value. Thus, a torque intended to cancel out the deviation of the actual angle from the target angle resulting from the driver's intervention steering is generated. This torque may hinder the driver's steering. Further, this torque may cause discomfort to the driver.

In this regard, according to the above configuration, when the driver turns the steering wheel while the host control device is intervening in steering control, not only the first control amount according to the turning state but also the third control amount according to the turning state is calculated. The third control amount is calculated based on the objective of offsetting the second control amount corresponding to the deviation of the actual angle from the target angle. Thus, a torque intended to cancel out the deviation of the actual angle from the target angle resulting from the driver's intervention steering is less likely to be generated. Therefore, even when the host control device is intervening in steering control, the driver can smoothly turn the steering wheel. This means an improvement in the steering feel that the driver experiences when performing intervention steering while the host control device is intervening in steering control. A new steering control device having such workings and effects can be obtained.

The steering control device may further include a fourth calculator that restricts a value of the second control amount calculated by the second calculator to be within a specified allowable range. This configuration can reduce the likelihood that when a second control amount having an excessively large value is calculated, the motor output may become excessively large based on that second control amount having an excessively large value.

The steering control device may further include: a fifth calculator configured to calculate a fourth control amount by summing the second control amount and the third control amount; and a sixth calculator configured to restrict a value of the fourth control amount calculated by the fifth calculator to be within a specified allowable range.

When the configuration is adopted in which, as described above, only the value of the second control amount calculated by the second calculator is restricted to be within a specified allowable range based on the objective of reducing the likelihood of an excessively large motor output, the following concern arises.

When the driver turns the steering wheel backward while the vehicle is turning with the host control device intervening in steering control, this leads to a situation where only the second control amount is restricted and only the third control amount increases. Conversely, when the driver turns the steering wheel forward while the vehicle is turning with the host control device intervening in steering control, this does not lead to the situation where only the second control amount is restricted and only the third control amount increases. Thus, the ease of steering through the steering wheel may differ between turning the steering wheel backward and turning it forward.

In this regard, according to the above configuration, the fourth control amount obtained by summing the second control amount and the third control amount is restricted. In other words, the fourth control amount having a value resulting from offsetting the second control amount by the third control amount is restricted. Therefore, when the driver turns the steering wheel backward while the vehicle is turning with the host control device intervening in steering control, this is less likely to lead to the situation where only the second control amount is restricted and only the third control amount increases. Thus, when the driver turns the steering wheel while the vehicle is turning with the host control device intervening in steering control, the steering feel of turning the steering wheel forward and the steering feel of turning it backward can be virtually equalized. This means an improvement in the steering feel that the driver experiences when performing intervention steering while the host control device is intervening in steering control.

In the steering control device, the second calculator may include: a feedforward controller configured to calculate a feedforward control amount through execution of feedforward control of adapting the actual angle to the target angle; a proportional controller configured to calculate a first feedback control amount having a value proportional to a deviation of the actual angle from the target angle by executing proportional operation on the deviation; an integral controller configured to calculate a second feedback control amount having a value proportional to an integral value of the deviation by executing integral operation on the deviation; a differential controller configured to calculate a third feedback control amount having a value proportional to a differential value of the deviation by executing differential operation on the deviation; a first adder configured to calculate a first additional value by summing the feedforward control amount and the second feedback control amount; a second adder configured to calculate a second additional value by summing the first feedback control amount and the third feedback control amount; a first restriction processor configured to restrict the first additional value to be within a specified allowable range; a second restriction processor configured to restrict the second additional value to be within a specified allowable range; and a third adder configured to calculate the second control amount as final by summing the first additional value having passed through the first restriction processor and the second additional value having passed through the second restriction processor.

With this configuration, the second control amount is less likely to increase as the driver turns the steering wheel while the vehicle is turning with the host control device intervening in steering control. Further, the final second control amount can be restricted to a value corresponding to the second control amount that is calculated when the driver is not turning the steering wheel while the vehicle is turning with the host control device intervening in steering control. Thus, when the driver turns the steering wheel while the vehicle is turning with the host control device intervening in steering control, the steering feel of turning the steering wheel forward and the steering feel of turning it backward can be virtually equalized.

In the steering control device, the second calculator may include: a feedforward controller configured to calculate a feedforward control amount through execution of feedforward control of adapting an actual angle to the target angle; a proportional controller configured to calculate a first feedback control amount having a value proportional to a deviation of the actual angle from the target angle by executing proportional operation on the deviation; an integral controller configured to calculate a second feedback control amount having a value proportional to an integral value of the deviation by executing integral operation on the deviation; a differential controller configured to calculate a third feedback control amount having a value proportional to a differential value of the deviation by executing differential operation on the deviation; a first adder configured to calculate a final feedback control amount by summing the first feedback control amount, the second feedback control amount, and the third feedback control amount; a first restriction processor configured to restrict the feedforward control amount to be within a specified allowable range; a second restriction processor configured to restrict the final feedback control amount to be within a specified allowable range; and a second adder configured to calculate the second control amount as final by summing the feedforward control amount having passed through the first restriction processor and the final feedback control amount having passed through the second restriction processor.

With this configuration, the second control amount is less likely to increase as the driver turns the steering wheel while the vehicle is turning with the host control device intervening in steering control. Further, the final second control amount can be restricted to a value corresponding to the second control amount that is calculated when the driver is not turning the steering wheel while the vehicle is turning with the host control device intervening in steering control. Thus, when the driver turns the steering wheel while the vehicle is turning with the host control device intervening in steering control, the steering feel of turning the steering wheel forward and the steering feel of turning it backward can be virtually equalized.

In the steering control device, the third calculator may be configured to, when the absolute value of the second control amount has reached a limit value of the specified allowable range, hold the third control amount at a value at that point in time when the absolute value of the second control amount has reached the limit value of the specified allowable range.

With this configuration, a situation where only the second control amount is restricted and only the third control amount increases is less likely to arise. Thus, when the driver turns the steering wheel while the vehicle is turning with the host control device intervening in steering control, the steering feel of turning the steering wheel forward and the steering feel of turning it backward can be virtually equalized.

The steering control device may be configured to, when the steering wheel is turned while the host control device is intervening in the steering control, adjust the second control amount and the third control amount such that a total value of the second control amount and the third control amount becomes equal to the second control amount immediately before the steering wheel is turned.

Also according to this configuration, when the driver turns the steering wheel while the vehicle is turning with the host control device intervening in steering control, the steering feel of turning the steering wheel forward and the steering feel of turning it backward can be virtually equalized.

In the steering control device, the second calculator may be configured to, when the steering wheel is turned while the host control device is intervening in the steering control, set values of a proportional gain, an integral gain, and a differential gain that are control parameters to values smaller than default values.

With this configuration, the performance of adapting the actual angle to the target angle is reduced. Thus, when the driver turns the steering wheel while the vehicle is turning with the host control device intervening in steering control, the difference between the steering feel of turning the steering wheel forward and the steering feel of turning it backward is reduced.

The steering control device may further include: a turning direction determiner that determines, based on a turning direction of the steering wheel, whether the turning state of the steering wheel is a backward turning state or a forward turning state; and a correction processing unit that, when the turning direction determiner determines that the turning state of the steering wheel is the backward turning state, corrects the third control amount calculated by the third calculator to a value smaller than the original third control amount corresponding to the turning state.

With this configuration, when the turning state of the steering wheel is a backward turning state, the third control amount is corrected to a value smaller than the original third control amount corresponding to the turning state. The situation where only the second control amount is restricted and only the third control amount increases is less likely to arise. Thus, when the driver turns the steering wheel while the vehicle is turning with the host control device intervening in steering control, the steering feel of turning the steering wheel forward and the steering feel of turning it backward can be virtually equalized.

With the steering control device of the disclosure, a new steering control device can be obtained that can improve the steering feel that the driver experiences when performing intervention steering.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Next, a first embodiment in which a steering control device is embodied as a control device of an electric power steering system (EPS) will be described.

Figure 1:
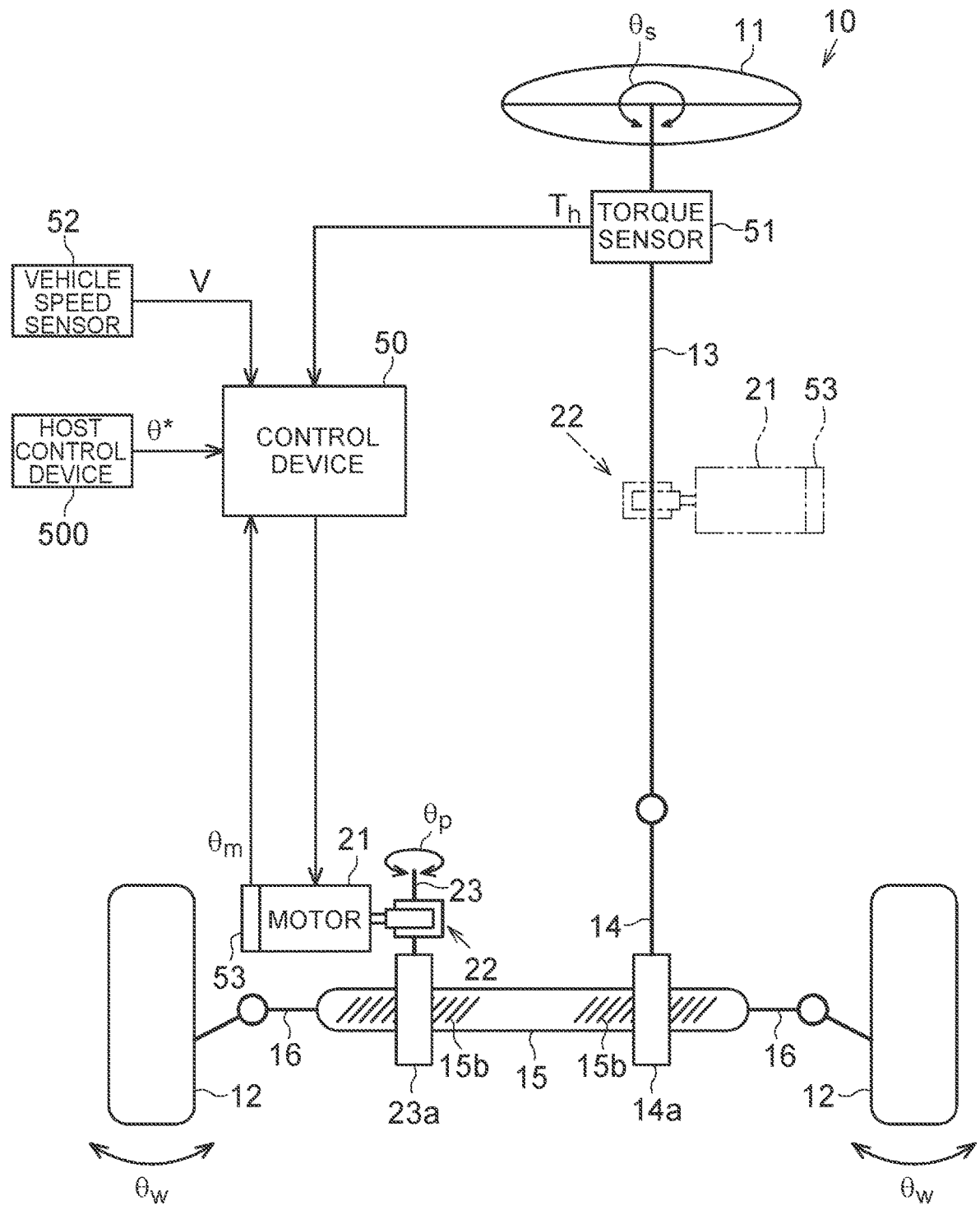
FIG. 1 is a configuration diagram of an electric power steering system equipped with a first embodiment of a steering control device.

As shown in FIG. 1, an EPS 10 has a steering shaft 13, a pinion shaft 14, and a turning shaft 15 that function as a power transmission path between a steering wheel 11 and turning wheels 12. The turning shaft 15 extends along a vehicle width direction (a left-right direction in FIG. 1). The turning wheels 12 are respectively coupled at both ends of the turning shaft 15 through tie rods 16. The pinion shaft 14 is provided so as to intersect with the turning shaft 15. Pinion teeth 14*a* of the pinion shaft 14 are meshed with rack teeth 15*a* of the turning shaft 15. The turning shaft 15 makes linear motion in conjunction with rotary operation of the steering wheel 11. The linear motion of the turning shaft 15 is transmitted to the left and right turning wheels 12 through the tie rods 16, which changes turning angles $\theta_w$ of the turning wheels 12.

The EPS 10 has a motor 21 and a speed reduction mechanism 22 as a configuration for generating an assistance force that is a force for assisting a driver in steering. The motor 21 functions as an assistance motor that is a source of generation of the assistance force. As the motor 21, for example, a three-phase brushless motor is used. The motor 21 is coupled to a pinion shaft 23 through the speed reduction mechanism 22. Pinion teeth 23*a* of the pinion shaft 23 are meshed with rack teeth 15*b* of the turning shaft 15. The speed of rotation of the motor 21 is reduced by the speed reduction mechanism 22, and a rotary force at the reduced speed is transmitted as an assistance force to the turning shaft 15 through the pinion shaft 23. The turning shaft 15 moves along the vehicle width direction according to rotation of the motor 21.

The EPS 10 has a control device 50. The control device 50 controls the motor 21 based on detection results of various sensors. These sensors include a torque sensor 51, a vehicle speed sensor 52, and a rotation angle sensor 53. The torque sensor 51 detects a steering torque $T_h$ that is applied to the steering shaft 13 through rotary operation of the steering wheel 11. The vehicle speed sensor 52 detects a vehicle speed V. The rotation angle sensor 53 is provided in the motor 21. The rotation angle sensor 53 detects a rotation angle $\theta_m$ of the motor 21. The control device 50 executes assistance control of generating an assistance force according to the steering torque $T_h$ through control of a current applied to the motor 21. The control device 50 controls electricity supplied to the motor 21 based on the steering torque $T_h$ detected through the torque sensor 51, the vehicle speed V detected through the vehicle speed sensor 52, and the rotation angle $\theta_m$ detected through the rotation angle sensor 53.

Here, some vehicles are equipped with an automated driving system that realizes various driving assistance functions for improving the safety or convenience of the vehicle, or automated driving functions that are functions of the system driving the vehicle instead of the driver. In this case, the vehicle is equipped with a host control device 500 that performs overall control of control devices of various in-vehicle systems. The host control device 500 determines an optimal control method based on the state of the vehicle at a given time and gives commands to individually control the various in-vehicle control devices according to the determined control method.

The host control device 500 intervenes in steering control performed by the control device 50. The host control device 500 has its automated driving control functions switched between on (valid) and off (invalid) through operation of a switch (not shown) provided in a driver's seat etc. The automated driving control functions include a driving assistance control function for improving the safety or convenience of the vehicle.

With the automated driving control functions turned on, the host control device 500 calculates a target angle $\theta^*$ as a command value for causing the vehicle to travel in a target lane. The target angle $\theta^*$ refers to, for example, a target value of the rotation angle $\theta_m$ of the motor 21, a pinion angle $\theta_p$, or a turning angle $\theta_s$, and in this embodiment, a target value of the rotation angle $\theta_m$ of the motor 21 is used as the target angle $\theta^*$. The control device 50 controls the motor 21 based on the target angle $\theta^*$ calculated by the host control device 500. The rotation angle $\theta_m$ of the motor 21, the pinion angle $\theta_p$, and the turning angle $\theta_s$ are angles that can be converted into a turning angle $\theta_s$ of the steering wheel 11 and the turning angles $\theta_w$ of the turning wheels 12.

Figure 2:
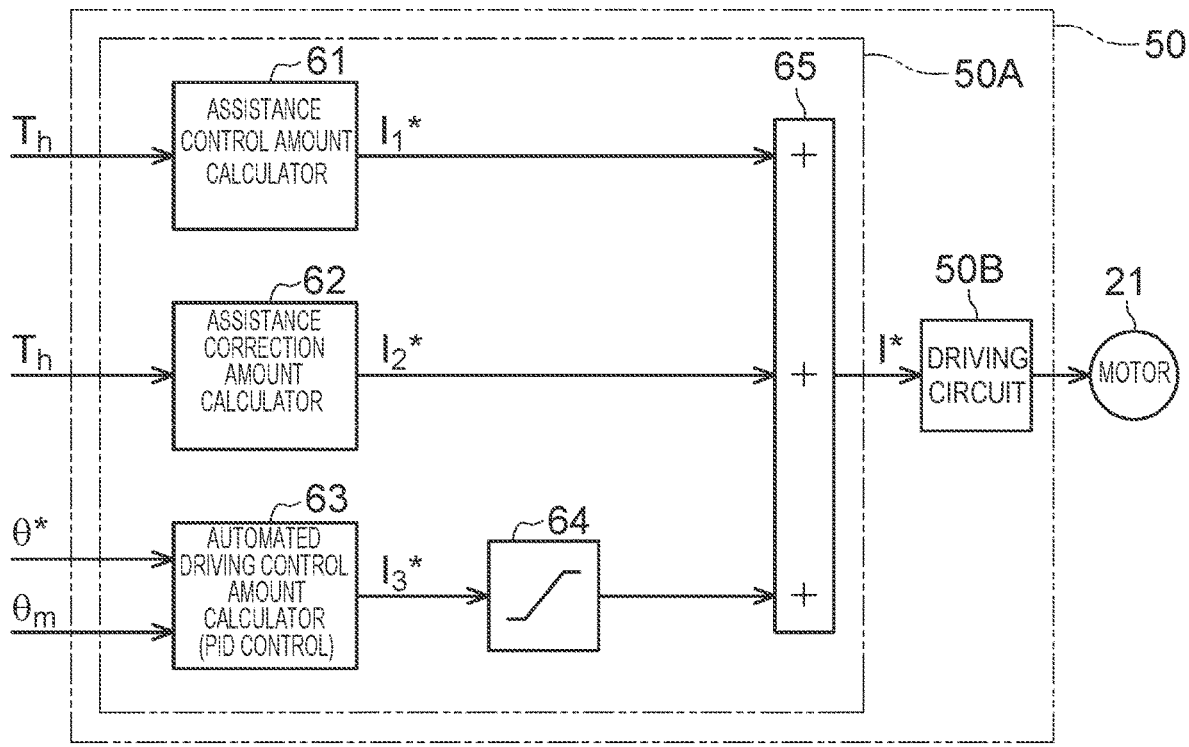
FIG. 2 is a block diagram of the first embodiment of the steering control device.

Next, the control device 50 will be described in detail. As shown in FIG. 2, the control device 50 has a microcomputer 50A and a driving circuit 50B. The driving circuit 50B supplies the motor 21 with driving electricity according to a current command value I* that is calculated by the microcomputer 50A.

The microcomputer 50A has an assistance control amount calculator 61, an assistance correction amount calculator 62, an automated driving control amount calculator 63, a restriction processing unit 64, and an adder 65. These operation parts are functional parts realized by a central processing unit (CPU) of the microcomputer 50A executing control programs. However, that these operation parts are realized by software is one example, and at least some of the operation parts may be realized by hardware, such as logic circuits.

The assistance control amount calculator 61 calculates an assistance control amount $I_1^*$ based on the steering torque $T_h$ detected through the torque sensor 51. The assistance control amount $I_1^*$ represents an amount of current that should be supplied to the motor 21 to cause the motor 21 to generate an assistance force of an appropriate magnitude according to the steering torque $T_h$. The assistance control amount calculator 61 calculates the assistance control amount $I_1^*$ using an assistance map M1. The assistance map M1 is stored in a storage device of the control device 50.

Figure 3:
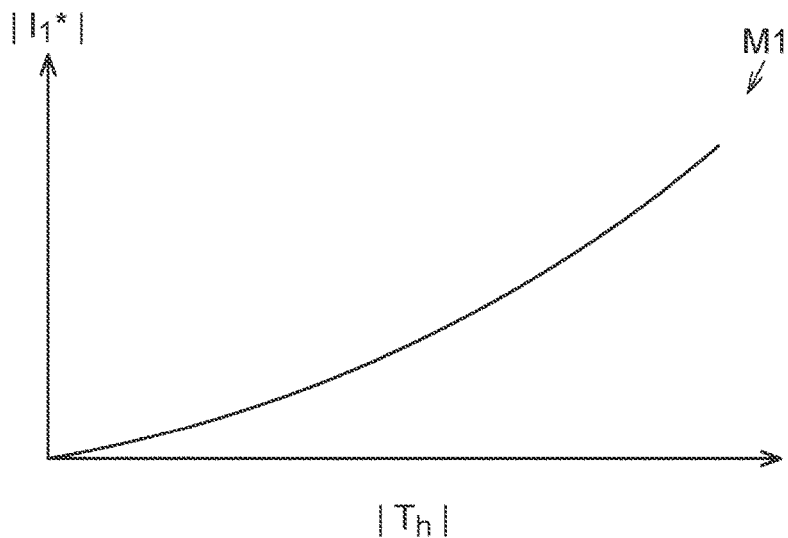
FIG. 3 is a graph showing an assistance map in the first embodiment.

As shown in the graph of FIG. 3, the assistance map M1 is a map with the abscissa representing the absolute value of the steering torque $T_h$ and the ordinate representing the absolute value of the assistance control amount $I_1^*$, and has the following characteristics: The absolute value of the assistance control amount $I_1^*$ is set to a larger value as the absolute value of the steering torque $T_h$ increases.

The assistance control amount calculator 61 may calculate the assistance control amount $I_1^*$ taking into account the vehicle speed V detected through the vehicle speed sensor 52. In this case, the characteristics of the assistance map M1 are set as follows: The absolute value of the assistance control amount $I_1^*$ is set to a larger value as the absolute value of the steering torque $T_h$ increases and as the vehicle speed V decreases.

The assistance correction amount calculator 62 operates only during a time when the automated driving control functions are on. The assistance correction amount calculator 62 calculates an assistance correction amount $I_2^*$ based on the steering torque $T_h$ detected through the torque sensor 51. The assistance correction amount $I_2^*$ represents an amount of current that should be applied to generate an assistance force of an appropriate magnitude according to the steering torque $T_h$ when the driver intervenes in steering during execution of automated driving control. That is, the assistance correction amount $I_2^*$ is calculated based on the objective of offsetting an automated driving control amount $I_3^*$ that is calculated by the automated driving control amount calculator 63 to be described later. The assistance correction amount calculator 62 calculates the assistance correction amount $I_2^*$ using an assistance correction map M2. The assistance correction map M2 is stored in the storage device of the control device 50.

Figure 4:
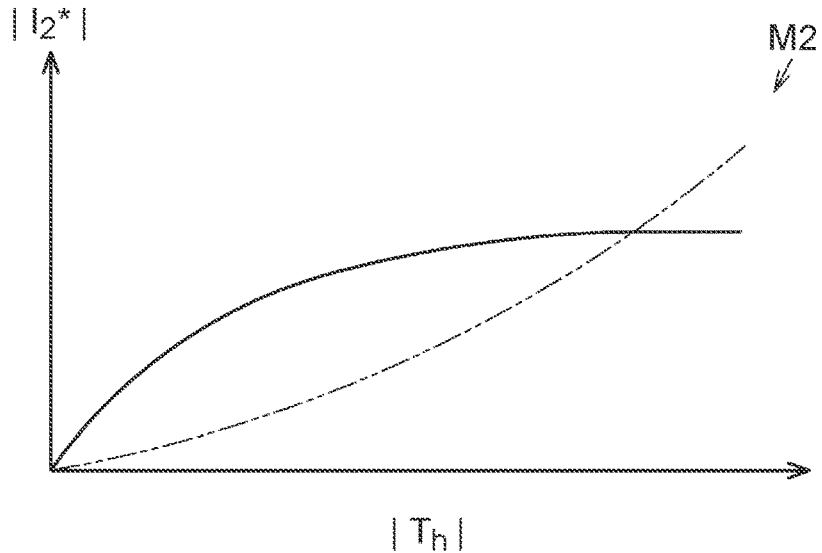
FIG. 4 is a graph showing an assistance correction map in the first embodiment.

As shown in the graph of FIG. 4, the assistance correction map M2 is a map with the abscissa representing the absolute value of the steering torque $T_h$ and the ordinate representing the absolute value of the assistance correction value $I_2^*$, and has the following characteristics: The absolute value of the assistance correction amount $I_2^*$ is set to a larger value as the absolute value of the steering torque $T_h$ increases. As the absolute value of the steering torque $T_h$ increases, the inclination that is the ratio of the amount of increase in the assistance correction amount $I_2^*$ to the amount of increase in the steering torque $T_h$ decreases gradually.

As indicated by the long dashed double-short dashed line in the graph of FIG. 4, the assistance correction map M2 may have the same characteristics as the assistance map M1 described above and shown in the graph of FIG. 3. The assistance correction amount calculator 62 may calculate the assistance correction amount $I_2^*$ taking into account the vehicle speed V detected through the vehicle speed sensor 52. In this case, the characteristics of the assistance correction map M2 are set as follows: The absolute value of the assistance correction amount $I_2^*$ is set to a larger value as the absolute value of the steering torque $T_h$ increases and as the vehicle speed V decreases.

The automated driving control amount calculator 63 operates only during a time when the automated driving control functions are on. The automated driving control amount calculator 63 takes in the target angle $\theta^*$ calculated by the host control device 500 and the rotation angle $\theta_m$ of the motor 21 detected through the rotation angle sensor 53. The automated driving control amount calculator 63 calculates the automated driving control amount $I_3^*$ through execution of feedback control of adapting the rotation angle $\theta_m$ of the motor 21 to the target angle $\theta^*$. The automated driving control amount calculator 63 calculates the automated driving control amount $I_3^*$ by, for example, calculating a deviation $\Delta\theta$ ($=\theta^*-\theta_m$) of the rotation angle $\theta_m$ of the motor 21 from the target angle $\theta^*$ and executing proportional operation, integral operation, and differential operation on the calculated deviation $\Delta\theta$. Thus, the automated driving control amount $I_3^*$ is the sum of an output value of a proportional element, an output value of an integral element, and an output value of a differential element using the deviation $\Delta\theta$ as an input. The automated driving control amount $I_3^*$ represents an amount of current that should be supplied to the motor 21 to cause the motor 21 to generate a torque for adapting the rotation angle $\theta_m$ of the motor 21 to the target angle $\theta^*$.

The restriction processing unit 64 performs a restriction process of restricting the value of the automated driving control amount $I_3^*$ calculated by the automated driving control amount calculator 63 to a value within a specified allowable range. When the absolute value of the automated driving control amount $I_3^*$ calculated by the automated driving control amount calculator 63 exceeds a limit value of the allowable range, the value of the automated driving control amount $I_3^*$ is restricted to the limit value. If the driving control amount $I_3^*$ has a positive value, the value of the automated driving control amount $I_3^*$ is restricted to a positive limit value when the value of the automated driving control amount $I_3^*$ exceeds the positive limit value. If the automated driving control amount $I_3^*$ has a negative value, the value of the automated driving control amount $I_3^*$ is restricted to a negative limit value when the value of the automated driving control amount $I_3^*$ exceeds the negative limit value. Thus, the motor 21 is less likely to generate an excessively high torque based on an excessively large automated driving control amount $I_3^*$ exceeding the limit value of the allowable range.

The adder 65 calculates a current command value $I^*$ for the motor 21 by summing the assistance control amount $I_1^*$, the assistance correction amount $I_2^*$, and the automated driving control amount $I_3^*$. Thus, the first embodiment can produce the following effects.

When the driver intervenes in steering during execution of automated driving control, not only the assistance control amount $I_1^*$ according to the steering torque $T_h$ but also the assistance correction amount $I_2^*$ according to the steering torque $T_h$ is calculated. Thus, the motor 21 generates an assistance force according to a current value obtained by summing the assistance control amount $I_1^*$ and the assistance correction amount $I_2^*$. That is, the motor 21 generates an assistance force that is larger by the assistance correction amount $I_2^*$ than an assistance force that is generated during normal manual operation in which the automated driving control functions are turned off. Moreover, the assistance correction amount $I_2^*$ is calculated based on the objective of offsetting the automated driving control amount $I_3^*$. Thus, the driver can smoothly operate the steering wheel 11 even during execution of automated driving control. That is, the driver is allowed to perform intervention steering during execution of automated driving control, and the steering feel that the driver experiences when performing intervention steering can be improved. A new control device 50 having such workings and effects can be obtained.

In automated driving control that assumes hands-free driving in which the driver keeps his or her hands off the steering wheel 11, to secure line tracing performance, for example, the control device 50 may calculate the automated driving control amount $I_3^*$ having a larger absolute value relative to the target angle $\theta^*$ and may have higher feedback performance. On the assumption of such a situation, the control device 50 of this embodiment is particularly preferable, as it adds the assistance correction amount $I_2^*$ for offsetting the automated driving control amount $I_3^*$ to the assistance control amount $I_1^*$ used for execution of normal assistance control to thereby improve the steering feel that the driver experiences when performing intervention steering during automated driving control.

Second Embodiment

Next, a second embodiment in which a steering control device is embodied as a control device of an EPS will be described. In the above-describe first embodiment, there is the following concern: When the driver performs intervention steering while the vehicle is turning under automated driving control, the driver may feel discomfort due to the difference in steering feel between turning the steering wheel 11 forward and turning it backward.

"Turning forward" refers to a turning state in which the driver is applying a torque to the steering wheel 11 in the same direction as the direction in which the steering wheel 11 is being turned by automated steering. "Turning backward" refers to a turning state in which the driver is applying a torque to the steering wheel 11 in the opposite direction from the direction in which the steering wheel 11 is being turned by automated steering.

Figure 5:
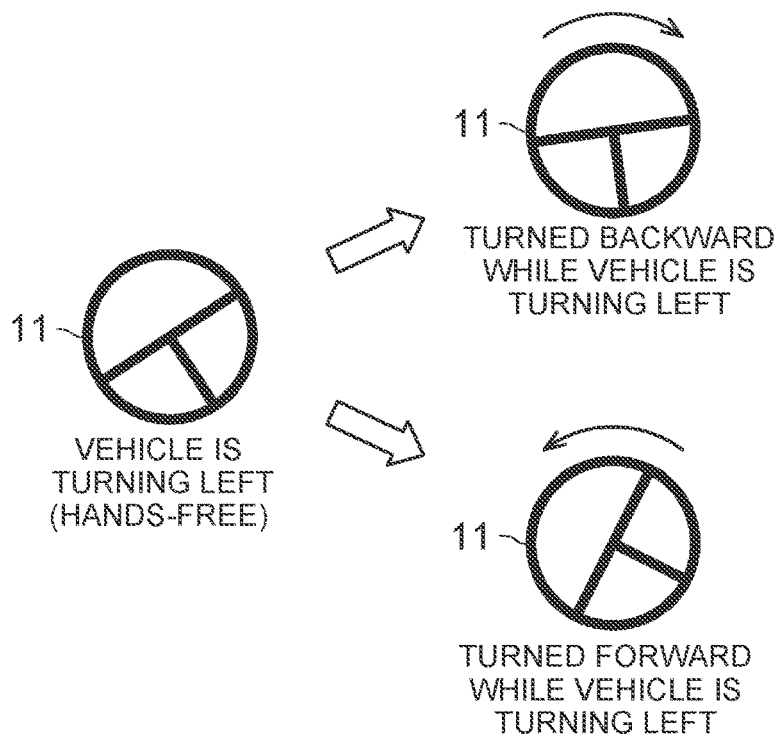
FIG. 5 is schematic views, of which the left view shows the position of a steering wheel when a vehicle is turning left under automated driving control; the upper right view shows the steering wheel turned backward by a driver while the vehicle is turning left under automated driving control; and the lower right view shows the steering wheel turned forward by the driver while the vehicle is turning left under automated driving control.
Figure 6:
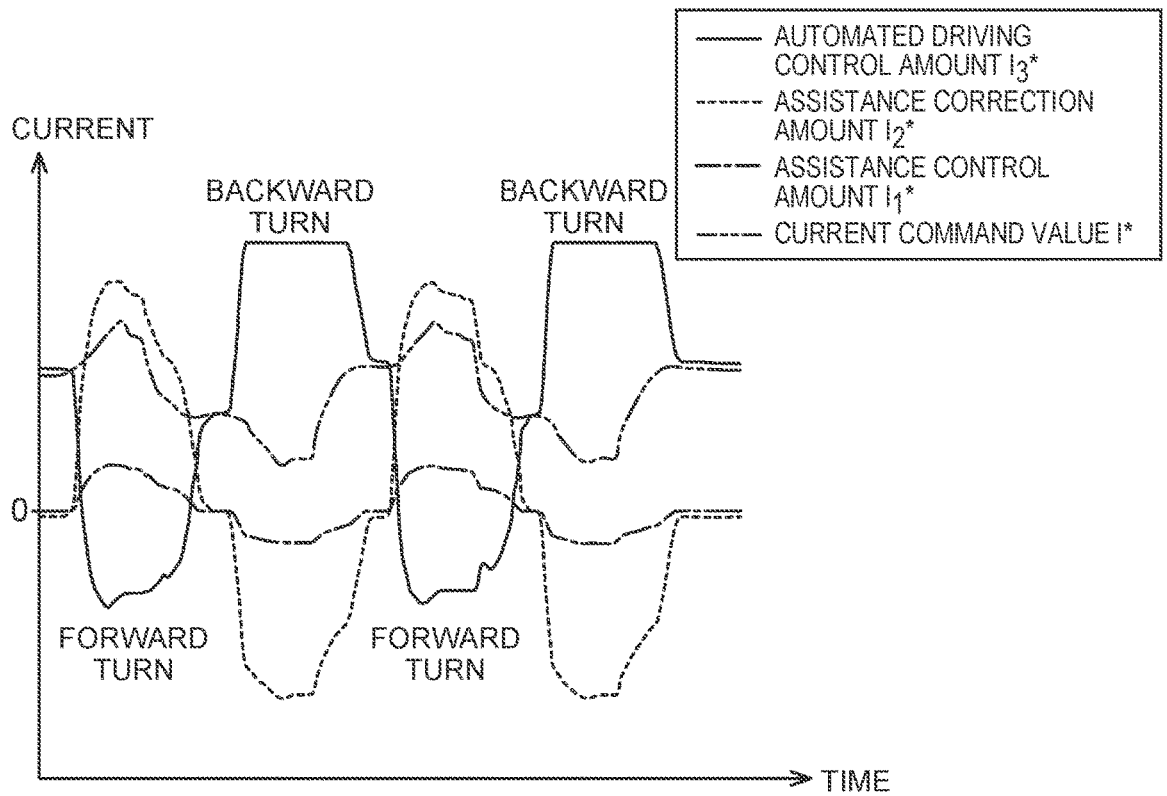
FIG. 6 is a graph showing changes over time in an automated driving control amount etc. in the first embodiment.

As shown in FIG. 5, for example, when the vehicle is turning left under automated driving control and the driver turns the steering wheel 11 backward in the opposite direction, the deviation of the rotation angle $\theta_m$ of the motor 21 from the target angle $\theta^*$ increases in the opposite direction from the turning direction of the vehicle (here, in a rightward direction). Accordingly, the automated driving control amount calculator 63 calculates the automated driving control amount $I_3^*$ to cancel out the increased deviation. The automated driving control amount $I_3^*$ calculated in this case is intended to bring back the rotation angle $\theta_m$ of the motor 21 in a forward turning direction by the amount by which the rotation angle $\theta_m$ of the motor 21 exceeds the target angle $\theta^*$ in a backward turning direction. Therefore, the automated driving control amount $I_3^*$ having the same sign as the current automated driving control amount $I_3^*$ is calculated. Thus, as the deviation of the rotation angle $\theta_m$ of the motor 21 from the target angle $\theta^*$ increases, the absolute value of the automated driving control amount $I_3^*$ increases and is eventually restricted by the restriction processing unit 64 as indicated by the solid line in the graph of FIG. 6.

Meanwhile, the assistance correction amount calculator 62 calculates the assistance correction amount $I_2^*$ of which the absolute value becomes larger as a backward turning amount, i.e., the absolute value of the steering torque $T_h$ increases in accordance with the assistance correction map M2 described above. Since the value of the automated driving control amount $I_3^*$ is restricted here, as indicated by the broken line in the graph of FIG. 6, a situation where only the assistance correction amount $I_2^*$ increases due to backward turn arises. Therefore, the driver is allowed to smoothly intervene in steering during automated driving, and feels the steering wheel lighter as the ease of steering through the steering wheel.

As shown in FIG. 5, for example, when the vehicle is turning left under automated driving control and the driver turns the steering wheel 11 forward in the same direction, the deviation of the rotation angle $\theta_m$ of the motor 21 from the target angle $\theta^*$ increases in the same direction as the turning direction of the vehicle (here, in a leftward direction). Accordingly, the automated driving control amount calculator 63 calculates the automated driving control amount $I_3^*$ to cancel out the increased deviation. The automated driving control amount $I_3^*$ calculated in this case is intended to bring back the rotation angle $\theta_m$ of the motor 21 in the backward turning direction by the amount by which the rotation angle $\theta_m$ of the motor 21 exceeds the target angle $\theta^*$ in the forward turning direction. Therefore, the automated driving control amount $I_3^*$ having the opposite sign from that of the current automated driving control amount $I_3^*$ is calculated. Thus, the absolute value of the automated driving control amount $I_3^*$ is less likely to increase in response to an increase in the deviation of the rotation angle $\theta_m$ of the motor 21 from the target angle $\theta^*$. That is, as indicated by the solid line in the graph of FIG. 6, during forward turn, the absolute value of the automated driving control amount $I_3^*$ is less likely to reach the limit value of the allowable range and the automated driving control amount $I_3^*$ is less likely to be restricted by the restriction processing unit 64.

The assistance correction amount calculator 62 calculates the assistance correction amount $I_2^*$ corresponding to the steering torque $T_h$ in accordance with the assistance correction map M2 described above. Here, the value of the automated driving control amount $I_3^*$ is not restricted. Therefore, as indicated by the broken line in the graph of FIG. 6, a situation where only the assistance correction amount $I_2^*$ increases due to backward turn does not arise. Thus, although the driver is allowed to smoothly intervene in steering during automated driving, as the ease of steering through the steering wheel 11, the driver feels the steering wheel 11 heavier than when turning it backward.

Figure 7:
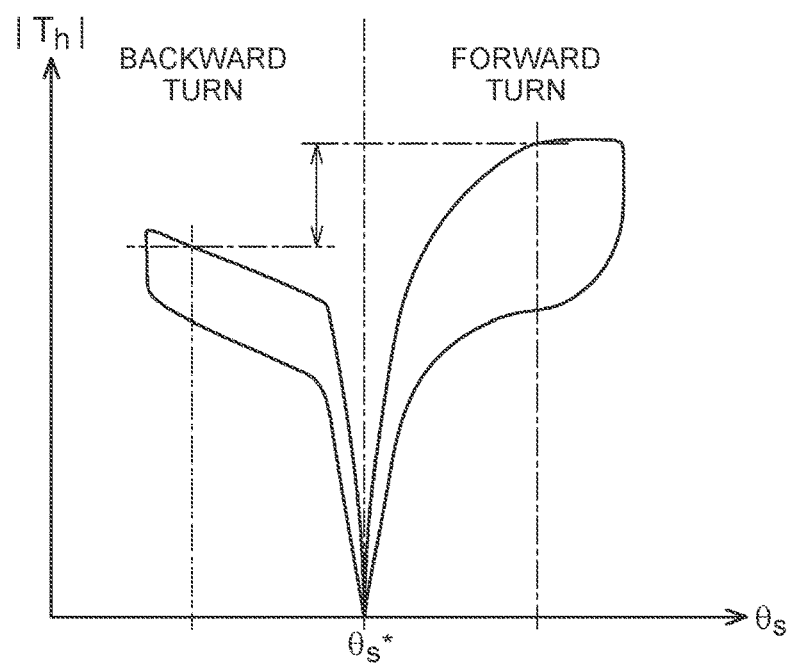
FIG. 7 is a graph showing a relationship between a turning angle and a steering torque in the first embodiment.

Specifically, as shown in the graph of FIG. 7, the characteristics of changes in the absolute value of the steering torque $T_h$ relative to a change in the turning angle $\theta_s$ are different between forward turn and backward turn with reference to a target turning angle $\theta_s^*$. The target turning angle $\theta_s^*$ refers to a rotation angle of the steering wheel 11 at which the rotation angle $\theta_m$ of the motor 21 matches the target angle $\theta^*$. More specifically, the maximum absolute value of the steering torque $T_h$ during backward turn is smaller than the maximum absolute value of the steering torque $T_h$ during forward turn. Thus, when the driver performs intervention steering while the vehicle is turning under automated driving control, the steering feel that the driver experiences as the ease of steering through the steering wheel 11 is different between forward turn and backward turn.

Also when the steering wheel 11 is turned forward and backward while the vehicle is turning right under automated driving control, as with when the steering wheel 11 is turned forward and backward while the vehicle is turning left under automated driving control, the steering feel is different between forward turn and backward turn.

Figure 8:
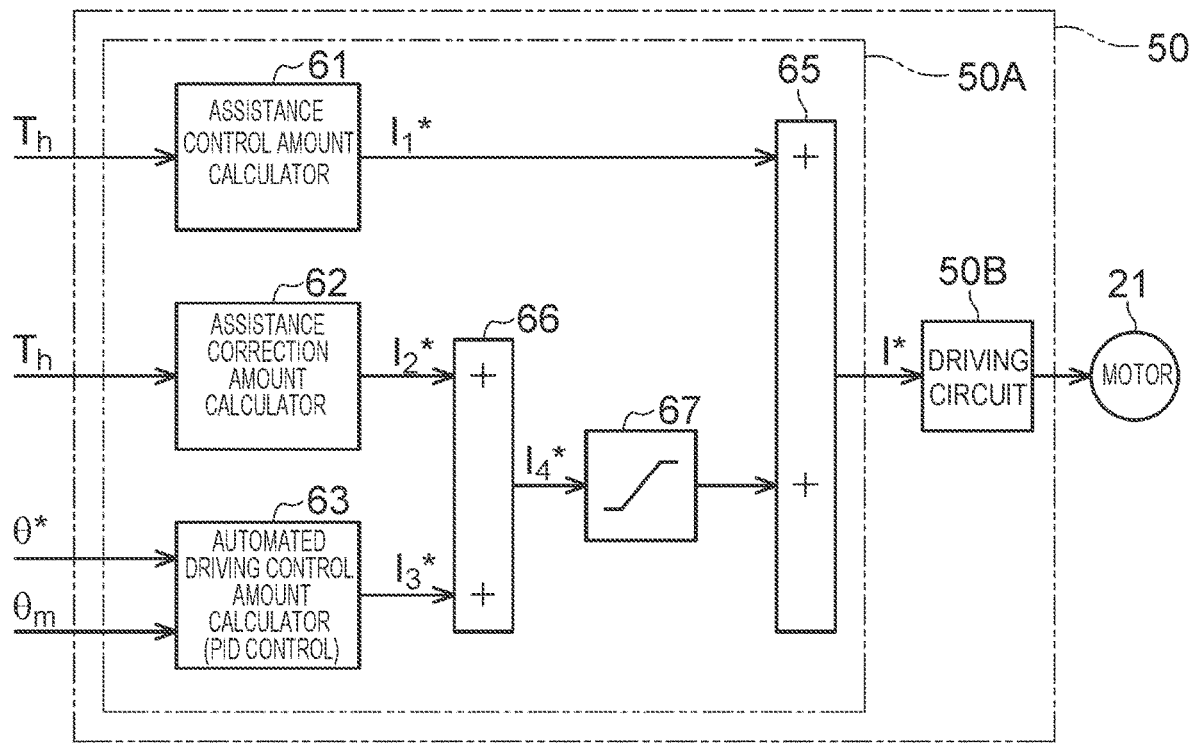
FIG. 8 is a block diagram of a second embodiment of the steering control device.

To eliminate the discomfort that the driver feels when performing intervention steering during execution of automated driving control, in this embodiment, the following configuration is adopted as the configuration of the control device 50. As shown in FIG. 8, the microcomputer 50A has an adder 66 and a restriction processing unit 67. The adder 66 calculates a final automated driving control amount $I_4^*$ by summing the assistance correction amount $I_2^*$ calculated by the assistance correction amount calculator 62 and the automated driving control amount $I_3^*$ calculated by the automated driving control amount calculator 63.

The restriction processing unit 67 restricts the final automated driving control amount $I_4^*$ calculated by the adder 66 to a value within a specified allowable range. When the value of the final automated driving control amount $I_4^*$ calculated by the adder 66 is a value within the allowable range, the final automated driving control amount $I_4^*$ calculated by the adder 66 is used as is in controlling the motor 21.

Next, the workings of this embodiment will be described. As shown in FIG. 5, for example, when the vehicle is turning left under automated driving control and the driver turns the steering wheel 11 backward in the opposite direction, the deviation of the rotation angle $\theta_m$ of the motor 21 from the target angle $\theta^*$ increases in the opposite direction from the turning direction of the vehicle. Accordingly, the automated driving control amount calculator 63 calculates the automated driving control amount $I_3^*$ to cancel out the increased deviation. The automated driving control amount $I_3^*$ calculated in this case is intended to bring back the rotation angle $\theta_m$ of the motor 21 in the forward turning direction by the amount by which the rotation angle $\theta_m$ of the motor 21 exceeds the target angle $\theta^*$ in the backward turning direction. Therefore, the automated driving control amount $I_3^*$ having the same sign as the current automated driving control amount $I_3^*$ is calculated. Thus, the absolute value of the automated driving control amount $I_3^*$ increases as the deviation of the rotation angle $\theta_m$ of the motor 21 from the target angle $\theta^*$ increases.

Meanwhile, the assistance correction amount calculator 62 calculates the assistance correction amount $I_2^*$ of which the absolute value becomes larger as the backward turning amount, i.e., the absolute value of the steering torque $T_h$ increases in accordance with the assistance correction map M2 described above. Here, the assistance correction amount $I_2^*$ has the same sign as the assistance control amount $I_1^*$ calculated by the assistance control amount calculator 61. The assistance correction amount $I_2^*$ is calculated based on the objective of canceling out the automated driving control amount $I_3^*$ calculated by the automated driving control amount calculator 63. Therefore, the sign of the assistance correction amount $I_2^*$ is opposite from the sign of the automated driving control amount $I_3^*$ calculated by the automated driving control amount calculator 63.

Figure 9:
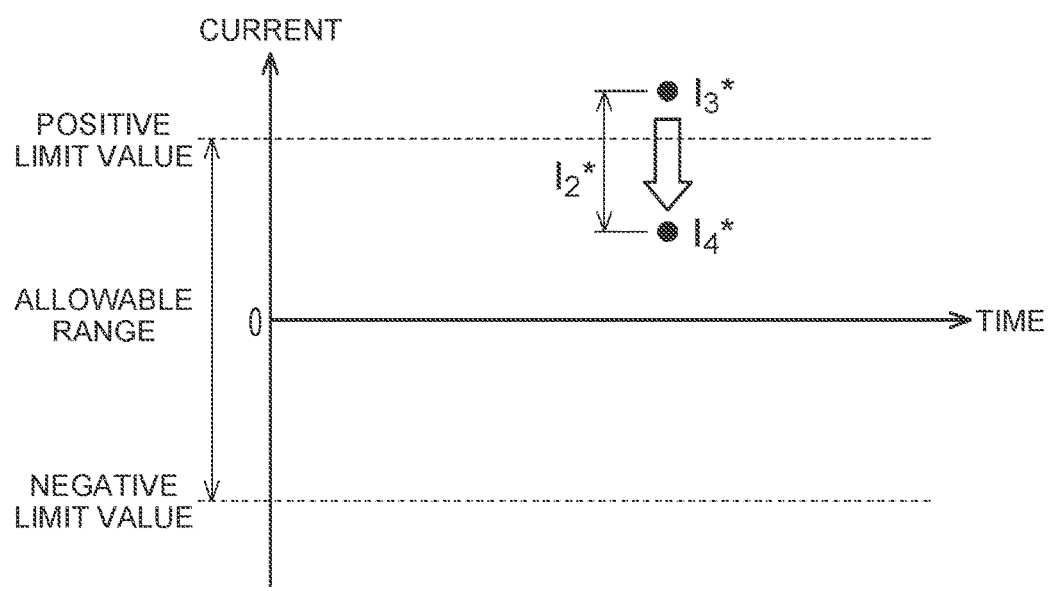
FIG. 9 is a graph showing a relationship between a final automated driving control amount and limit values of an allowable range of the automated driving control amount in the second embodiment.
Figure 10:
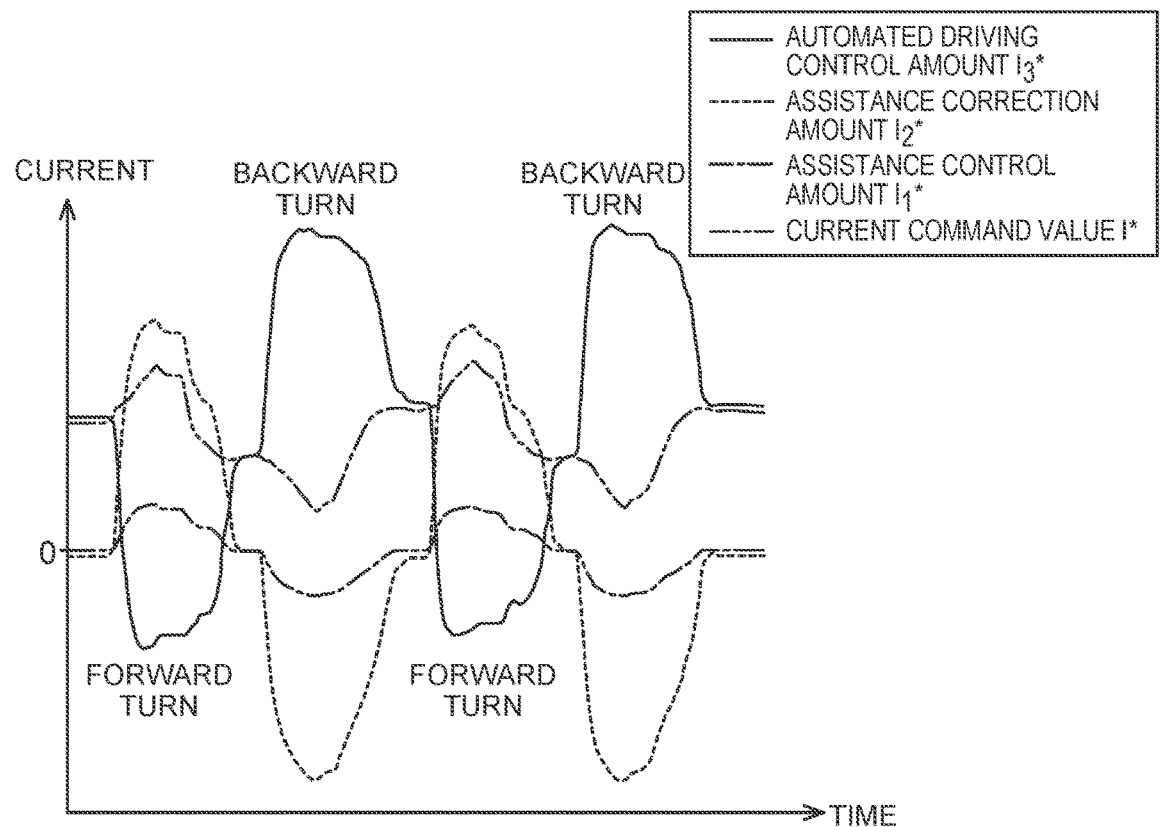
FIG. 10 is a graph showing a relationship between the turning angle and the steering torque in the second embodiment.

Thus, as shown in the graph of FIG. 9, even when the absolute value of the automated driving control amount $I_3^*$ calculated by the automated driving control amount calculator 63 exceeds the limit value of the allowable range, the absolute value of the final automated driving control amount $I_4^*$ calculated by the adder 66 is a value within the allowable range. This is because the automated driving control amount $I_3^*$ calculated by the automated driving control amount calculator 63 is offset by the assistance correction amount $I_2^*$ calculated by the assistance correction amount calculator 62. Therefore, as indicated by the solid line in the graph of FIG. 10, even when the absolute value of the automated driving control amount $I_3^*$ calculated by the automated driving control amount calculator 63 exceeds the limit value of the allowable range, the value of the automated driving control amount $I_3^*$ is not restricted.

While the assistance correction amount calculator 62 calculates the assistance correction amount $I_2^*$ according to the backward turning amount, i.e., the steering torque $T_h$ in accordance with the assistance correction map M2 described above, here, the value of the automated driving control amount $I_3^*$ can be regarded as not being restricted. Therefore, as indicated by the broken like in the graph of FIG. 10, a situation where only the assistance correction amount $I_2^*$ increases as the backward turning amount increases does not arise. The absolute value of the automated driving control amount $I_3^*$ also increases according to the backward turning amount, i.e., the deviation of the rotation angle $\theta_m$ of the motor 21 from the target angle $\theta^*$. Thus, the relationship between the value of the assistance correction amount $I_2^*$ and the value of the automated driving control amount $I_3^*$ is maintained as the original relationship in which the value of the automated driving control amount $I_3^*$ is not restricted.

As shown in FIG. 5, for example, when the vehicle is turning left under automated driving control and the driver turns the steering wheel 11 forward in the same direction, the automated driving control amount $I_3^*$ having the opposite sign from that of the current automated driving control amount $I_3^*$ is calculated. Thus, during forward turn, the absolute value of the automated driving control amount $I_3^*$ is less likely to increase in response to an increase in the deviation of the rotation angle $\theta_m$ of the motor 21 from the target angle $\theta^*$, and as indicated by the solid line in the graph of FIG. 10, the automated driving control amount $I_3^*$ is less likely to be restricted.

Meanwhile, the assistance correction amount calculator 62 calculates the assistance correction amount $I_2^*$ corresponding to the steering torque $T_h$ in accordance with the assistance correction map M2 described above. Since the value of the automated driving control amount $I_3^*$ is not restricted here, as indicated by the broken line in the graph of FIG. 10, a situation where only the assistance correction amount $I_2^*$ increases due to backward turn does not arise. The absolute value of the automated driving control amount $I_3^*$ also increases according to the backward turning amount, i.e., the steering torque $T_h$. Therefore, the driver is allowed to smoothly intervene in steering during automated driving, and as the ease of steering through the steering wheel 11, can experience the same steering feel as when turning the steering wheel 11 backward.

Figure 11:
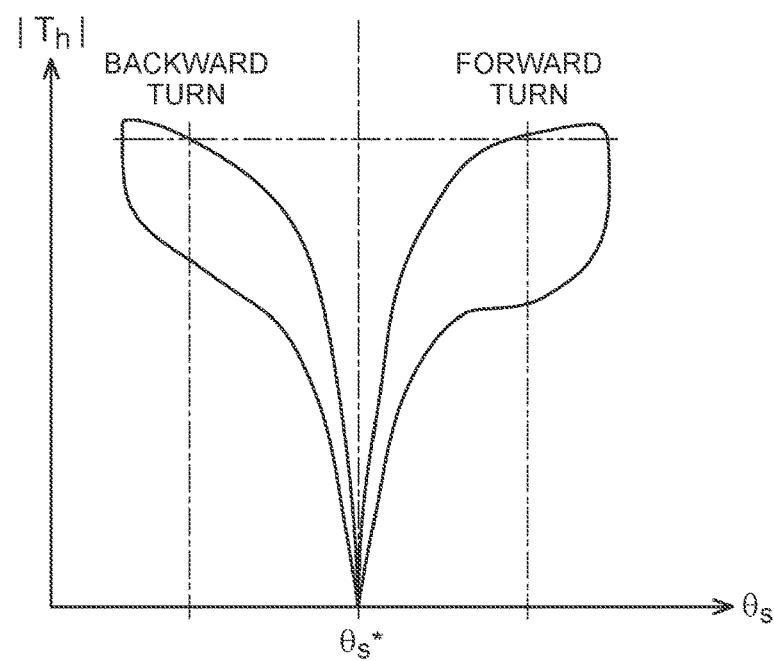
FIG. 11 is a graph showing changes over time in the automated driving control amount etc. in the second embodiment.

As shown in the graph of FIG. 11, the characteristics of changes in the absolute value of the steering torque $T_h$ relative to a change in the turning angle $\theta_s$ are substantially the same during forward turn and during backward turn with reference to the target turning angle $\theta_s^*$. More specifically, the maximum absolute value of the steering torque $T_h$ during backward turn is substantially equal to the maximum absolute value of the steering torque $T_h$ during forward turn. Thus, when the driver performs intervention steering while the vehicle is turning under automated driving control, the steering feel that the driver experiences as the ease of steering through the steering wheel 11 is substantially the same during forward turn and during backward turn.

Thus, the second embodiment can produce the following effect in addition to the effect (1) of the first embodiment described above. The adder 66 calculates the final automated driving control amount $I_4^*$ by summing the assistance correction amount $I_2^*$ and the automated driving control amount $I_3^*$, and this final automated driving control amount $I_4^*$ is restricted to a value within a specified allowable range.

Thus, a situation where only the automated driving control amount $I_3^*$ is restricted and only the assistance correction amount $I_2^*$ increases is less likely to arise. Therefore, when the driver performs intervention steering while the vehicle is turning under automated driving control, the steering feel of turning the steering wheel forward and the steering feel of turning it backward are virtually equalized. This means an improvement in the steering feel that the driver experiences when performing intervention steering during execution of automated driving control.

Third Embodiment

Next, a third embodiment in which a steering control device is embodied as a control device of an EPS will be described. This embodiment differs from the above-described first embodiment in terms of the configuration of the microcomputer 50A.

Figure 12:
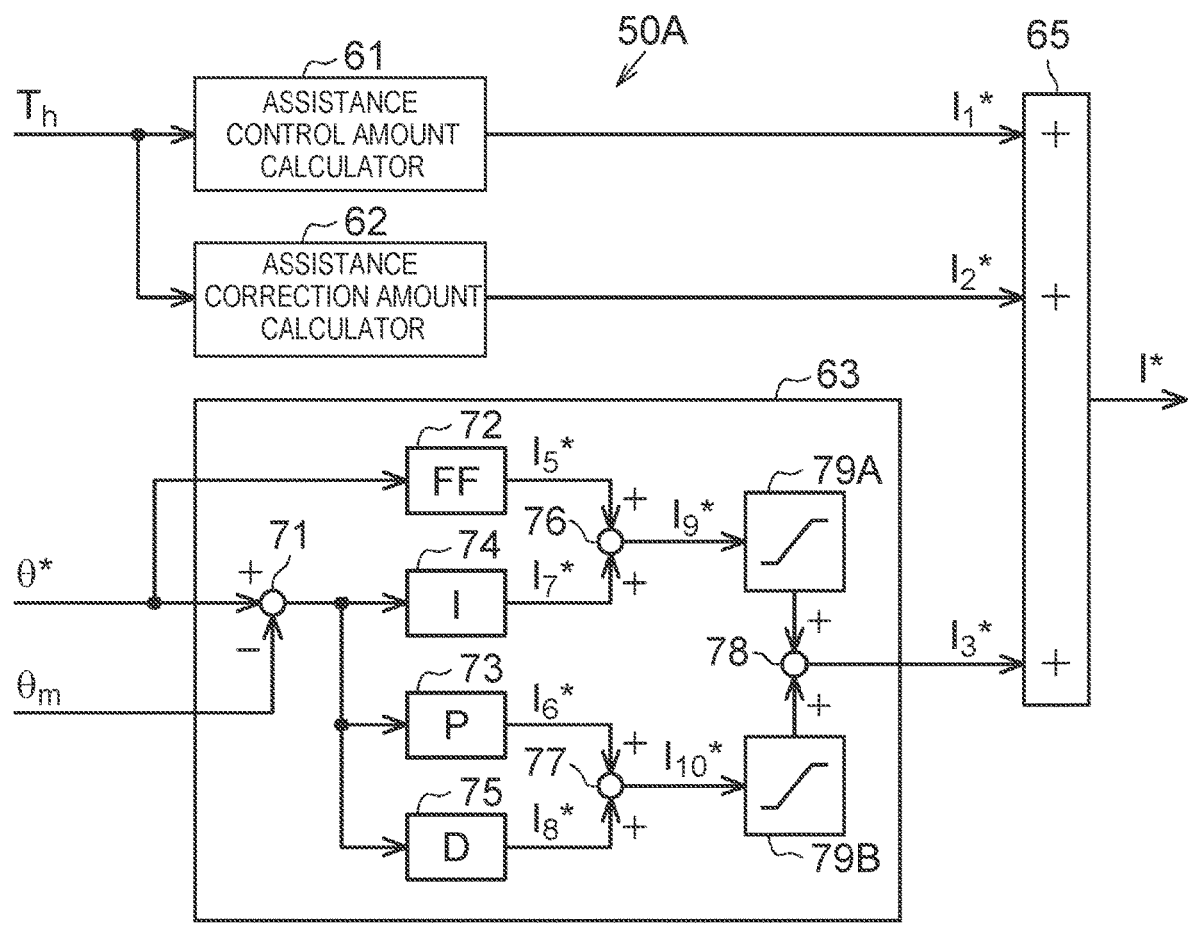
FIG. 12 is a block diagram of a microcomputer in a third embodiment of the steering control device.

As shown in FIG. 12, the automated driving control amount calculator 63 has a subtractor 71, a feedforward controller 72, a proportional controller 73, an integral controller 74, a differential controller 75, three adders 76, 77, 78, and two restriction processors 79A, 79B.

The subtractor 71 calculates the deviation $\Delta\theta$ ($=\theta^*-\theta_m$) of the rotation angle $\theta_m$ of the motor 21 detected through the rotation angle sensor 53 from the target angle $\theta^*$ calculated by the host control device 500. The feedforward controller 72 is provided to compensate for a delay in response due to inertia of the EPS 10 and increase the control responsiveness. The feedforward controller 72 calculates a target angle acceleration rate $\alpha$ ($=d^2\theta^*/dt^2$) by performing second-order differentiation on the target angle $\theta^*$, and calculates a feedforward control amount $I_5^*$ ($=J\cdot\alpha$) as an inertia compensation value by multiplying the calculated target angle acceleration rate $\alpha$ by inertia J of the EPS 10. The inertia J is obtained, for example, from a physical model of the EPS 10.

The proportional controller 73 calculates a first feedback control amount $I_6^*$ having a value proportional to the deviation $\Delta\theta$ by executing proportional operation on the deviation $\Delta\theta$ calculated by the subtractor 71. The integral controller 74 calculates a second feedback control amount $I_7^*$ having a value proportional to an integral value of the deviation $\Delta\theta$ by executing integral operation on the deviation $\Delta\theta$ calculated by the subtractor 71. The integral controller 74 stops the operation of integration while the driver is performing intervention steering during execution of automated driving control.

The differential controller 75 calculates a third feedback control amount $I_8^*$ having a value proportional to a differential value of the deviation $\Delta\theta$ by executing differential operation on the deviation $\Delta\theta$ calculated by the subtractor 71.

The adder 76 calculates a first automated driving control amount $I_9^*$ by summing the feedforward control amount $I_5^*$ calculated by the feedforward controller 72 and the second feedback control amount $I_7^*$ calculated by the integral controller 74.

The adder 77 calculates a second automated driving control amount $I_{10}^*$ by summing the first feedback control amount $I_6^*$ calculated by the proportional controller 73 and the third feedback control amount $I_8^*$ calculated by the differential controller 75.

The restriction processor 79A restricts the first automated driving control amount $I_9^*$ calculated by the adder 76 to a value within a specified allowable range. The restriction processor 79B restricts the second automated driving control amount $I_{10}*$ calculated by the adder 77 to a value within a specified allowable range. These allowable ranges are set, for example, with reference to the automated driving control amount $I_3*$ that is calculated while automated driving control assuming hands-free driving is executed.

The adder 78 calculates the automated driving control amount $I_3*$ as final by summing the first automated driving control amount $I_9*$ having passed through the restriction processor 79A and the second automated driving control amount $I_{10}*$ having passed through the restriction processor 79B.

Thus, the third embodiment can produce the following effect: Each of the first automated driving control amount $I_9*$ that is an additional value of the feedforward control amount $I_5*$ and the second feedback control amount $I_7*$ and the second automated driving control amount $I_{10}*$ that is an additional value of the first feedback control amount $I_6*$ and the third feedback control amount $I_8*$ is restricted to a value within the specified allowable range. An additional value of the first automated driving control amount $I_9*$ and the second automated driving control amount $I_{10}*$ is used as the final automated driving control amount $I_3*$ in controlling the motor 21. Thus, the automated driving control amount $I_3*$ is less likely to increase due to intervention steering. Further, the final automated driving control amount $I_3*$ can be restricted to a value corresponding to the automated driving control amount $I_3*$ that is calculated while automated driving control assuming hands-free driving is executed. Therefore, when the driver performs intervention steering while the vehicle is turning under automated driving control, the steering feel of turning the steering wheel forward and the steering feel of turning it backward are virtually equalized. This means an improvement in the steering feel that the driver experiences when performing intervention steering during execution of automated driving control.

Fourth Embodiment

Next, a fourth embodiment in which a steering control device is embodied as a control device of an EPS will be described. This embodiment differs from the above-described third embodiment in terms of the configuration of the automated driving control amount calculator 63.

Figure 13:
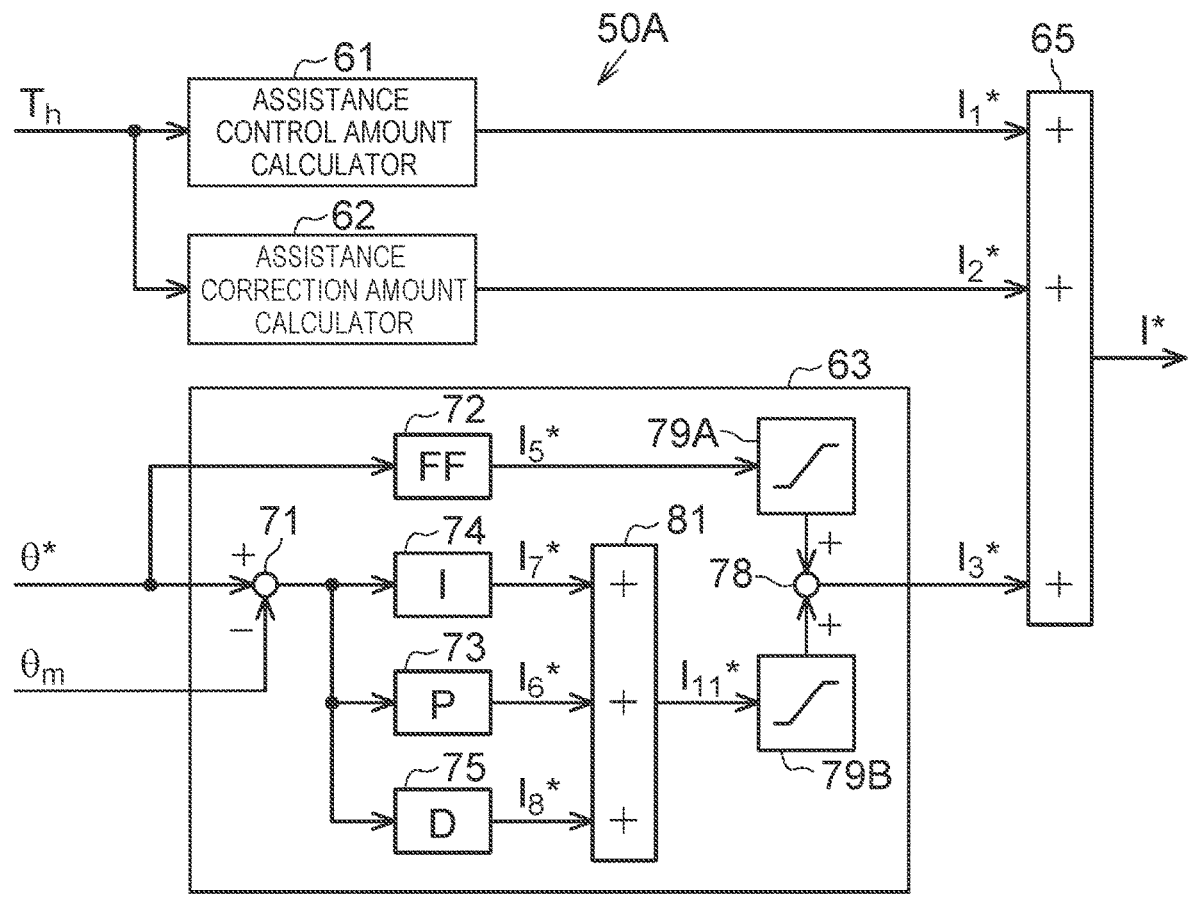
FIG. 13 is a block diagram of a microcomputer in a fourth embodiment of the steering control device.

As shown in FIG. 13, the automated driving control amount calculator 63 has an adder 81 in addition to the subtractor 71, the feedforward controller 72, the proportional controller 73, the integral controller 74, the differential controller 75, the adder 78, and the two restriction processors 79A, 79B.

The adder 81 calculates a final feedback control amount $I_{11}*$ by summing the first feedback control amount $I_6*$ calculated by the proportional controller 73, the second feedback control amount $I_7*$ calculated by the integral controller 74, and the third feedback control amount $I_8*$ calculated by the differential controller 75.

The restriction processor 79A restricts the feedforward control amount $I_5*$ calculated by the feedforward controller 72 to a value within a specified allowable range. The restriction processor 79B restricts the final feedback control amount $I_{11}*$ calculated by the adder 81 to a value within a specified allowable range.

The adder 78 calculates the automated driving control amount $I_3*$ by summing the feedforward control amount $I_5*$ having passed through the restriction processor 79A and the feedback control amount $I_{11}*$ having passed through the restriction processor 79B.

Thus, the fourth embodiment can produce the following effect: Each of the feedforward control amount $I_5*$ calculated by the feedforward controller 72 and the final feedback control amount $I_{11}*$ calculated by the adder 81 is restricted to a value within the specified allowable range. An additional value of the restricted feedforward control amount $I_5*$ and feedback control amount $I_{11}*$ is used as the final automated driving control amount $I_3*$ in controlling the motor 21. Thus, the automated driving control amount $I_3*$ is less likely to increase due to intervention steering. Further, the final automated driving control amount $I_3*$ can be restricted to a value corresponding to the automated driving control amount $I_3*$ that is calculated while automated driving control assuming hands-free driving is executed. Therefore, when the driver performs intervention steering while the vehicle is turning under automated driving control, the steering feel of turning the steering wheel forward and the steering feel of turning it backward are virtually equalized. This means an improvement in the steering feel that the driver experiences when performing intervention steering during execution of automated driving control.

Fifth Embodiment

Next, a fifth embodiment in which a steering control device is embodied as a control device of an EPS will be described. This embodiment differs from the above-described first embodiment in terms of the process executed by the microcomputer 50A.

Figure 14:
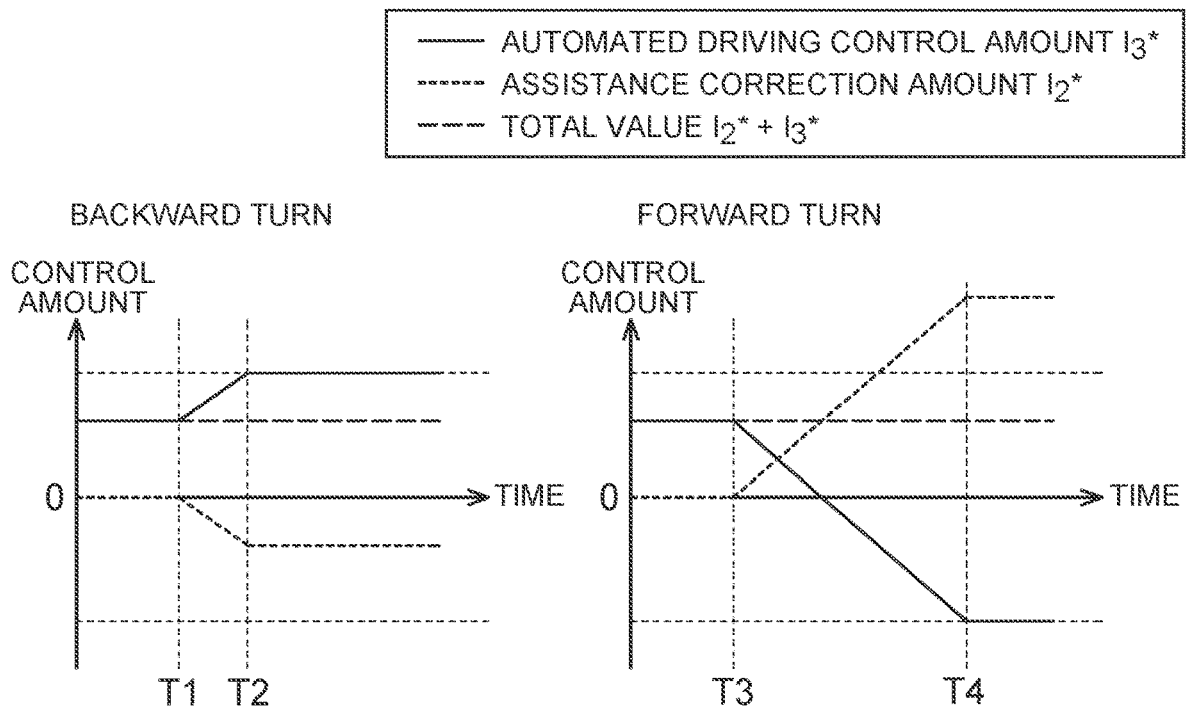
FIG. 14 is graphs, of which the left graph shows changes over time in the automated driving control amount and an assistance correction amount in the case of backward turn in a fifth embodiment of the steering control device, and the right graph shows changes over time in the automated driving control amount and the assistance correction amount in the case of forward turn.

As indicated by the solid characteristic line in the left graph of FIG. 14, when the vehicle is turning left under automated driving control and the driver turns the steering wheel 11 backward in the opposite direction (time T1), as the deviation of the rotation angle $\theta_m$ of the motor 21 from the target angle $\theta*$ increases, the absolute value of the automated driving control amount $I_3*$ may reach the limit value of the allowable range and be restricted by the restriction processing unit 64. Meanwhile, the absolute value of the assistance correction amount $I_2*$ becomes larger as the backward turning amount, i.e., the absolute value of the steering torque $T_h$ increases. This may lead to a situation where only the assistance correction amount $I_2*$ increases due to backward turn.

As a countermeasure, the microcomputer 50A executes the following process when the absolute value of the automated driving control amount $I_3*$ has reached the limit value (e.g., the positive limit value) of the allowable range.

As indicated by the broken characteristic line in the left graph of FIG. 14, when the absolute value of the automated driving control amount $I_3*$ has reached the limit value of the allowable range (time T2), the microcomputer 50A holds the assistance correction amount $I_2*$ calculated by the assistance correction amount calculator 62 at a value at that point in time when the absolute value of the automated driving control amount $I_3*$ has reached the limit value of the allowable range. Thus, the situation where only the assistance correction amount $I_2*$ increases as the steering torque $T_h$ increases due to backward turn is less likely to arise. The absolute value of the assistance correction amount $I_2*$ held here is equal to the absolute value of an increase in the automated driving control amount $I_3*$ due to backward turn. Therefore, the total value obtained by summing the restricted automated driving control amount $I_3*$ and the held assistance correction amount $I_2*$ ($=I_2*+I_3*$) is the following value.

As indicated by the dashed characteristic line in the left graph of FIG. 14, the total value of the automated driving control amount $I_3^*$ and the assistance correction amount $I_2^*$ is equal to the value of the automated driving control amount $I_3^*$ before time T1 at which the driver turns the steering wheel 11 backward.

As indicated by the solid characteristic line in the right graph of FIG. 14, also when the vehicle is turning left under automated driving control and the driver turns the steering wheel 11 forward in the same direction (time T3), the absolute value of the automated driving control amount $I_3^*$ may be restricted by the restriction processing unit 64. Thus, also during forward turn, only the assistance correction amount $I_2^*$ may increase. As a countermeasure, the microcomputer 50A executes the following process when the absolute value of the automated driving control amount $I_3^*$ has reached the limit value (e.g., the negative limit value) of the allowable range.

As indicated by the broken characteristic line in the right graph of FIG. 14, when the absolute value of the automated driving control amount $I_3^*$ has reached the limit value of the allowable range (time T4), the microcomputer 50A holds the assistance correction amount $I_2^*$ calculated by the assistance correction amount calculator 62 at a value at that point in time when the absolute value of the automated driving control amount $I_3^*$ has reached the limit value of the allowable range. Thus, a situation where only the assistance correction amount $I_2^*$ increases as the steering torque $T_h$ increases due to forward turn is less likely to arise. The absolute value of the assistance correction amount $I_2^*$ held here is equal to the absolute value of an increase in the automated driving control amount $I_3^*$ due to forward turn. Therefore, the total value obtained by summing the restricted automated driving control amount $I_3^*$ and the held assistance correction amount $I_2^*$ ($=I_2^*+I_3^*$) is the following value.

As indicated by the dashed characteristic line in the right graph of FIG. 14, the total value of the automated driving control amount $I_3^*$ and the assistance correction amount $I_2^*$ is equal to the value of the automated driving control amount $I_3^*$ before time T3 at which the driver turns the steering wheel 11 backward.

A case where the steering wheel 11 is turned forward and backward while the vehicle is turning right under automated driving control is the same as the case where the steering wheel 11 is turned forward and backward while the vehicle is turning left under automated driving control.

Thus, the fifth embodiment can produce the following effect: When the absolute value of the automated driving control amount $I_3^*$ has reached the limit value of the allowable range due to the driver's intervention steering during execution of the automated driving control, the assistance correction amount $I_2^*$ is held at a value at that point in time when the absolute value of the automated driving control amount $I_3^*$ has reached the limit value of the allowable range. Thus, a situation where only the automated driving control amount $I_3^*$ is restricted and only the assistance correction amount $I_2^*$ increases is less likely to arise. Therefore, when the driver performs intervention steering while the vehicle is turning under automated driving control, the steering feel of turning the steering wheel forward and the steering feel of turning it backward are virtually equalized. This means an improvement in the steering feel that the driver experiences when performing intervention steering during execution of automated driving control.

Sixth Embodiment

Next, a sixth embodiment in which a steering control device is embodied as a control device of an EPS will be described. This embodiment differs from the above-described first embodiment in terms of the process executed by the microcomputer 50A.

The microcomputer 50A has a function of determining the driver's intentional intervention in steering during execution of automated driving control. The microcomputer 50A determines the driver's intervention in steering, for example, based on the steering torque $T_h$ detected through the torque sensor 51.

Figure 15:
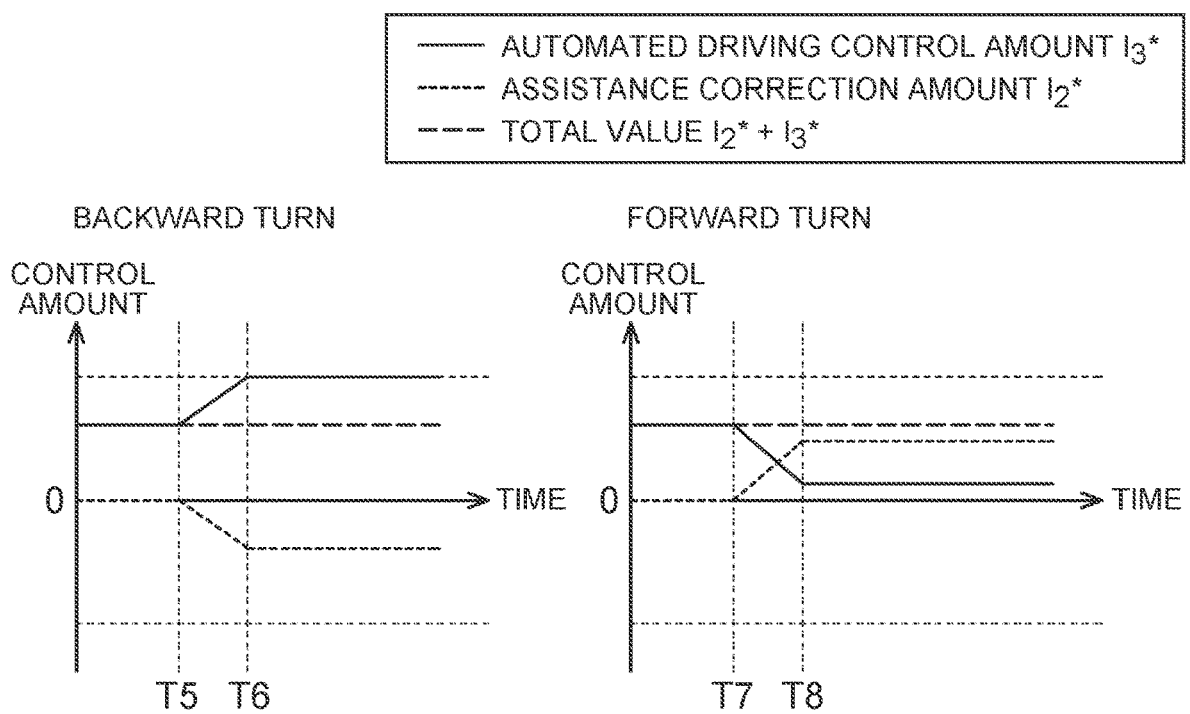
FIG. 15 is graphs, of which the left graph shows changes over time in the automated driving control amount and the assistance correction amount in the case of backward turn in a sixth embodiment of the steering control device, and the right graph shows changes over time in the automated driving control amount and the assistance correction amount in the case of forward turn.

As shown in the left graph of FIG. 15, when the vehicle is turning left under automated driving control and the driver turns the steering wheel 11 backward in the opposite direction (time T5), it is determined that the steering wheel 11 is being turned backward (time T6), which triggers execution of the following process.

Each of the value of the automated driving control amount $I_3^*$ and the value of the assistance correction amount $I_2^*$ is held at a predetermined value such that the total value of the assistance correction amount $I_2^*$ and the automated driving control amount $I_3^*$ ($=I_2^*+I_3^*$) becomes equal to the value of the automated driving control amount $I_3^*$ before time T5 at which the driver turns the steering wheel 11 backward.

As shown in the right graph of FIG. 15, when the vehicle is turning right under automated driving control and the driver turns the steering wheel 11 forward in the same direction (time T7), it is determined that the steering wheel 11 is being turned forward (time T8), which triggers execution of the following process.

Each of the value of the automated driving control amount $I_3^*$ and the value of the assistance correction amount $I_2^*$ is adjusted to a predetermined value and held at the adjusted value such that the total value of the assistance correction amount $I_2^*$ and the automated driving control amount $I_3^*$ ($=I_2^*+I_3^*$) becomes equal to the value of the automated driving control amount $I_3^*$ immediately before time T7 at which the driver turns the steering wheel 11 forward.

Thus, theسixth embodiment can produce the following effect: When it is determined that the driver is performing intervention steering during execution of automated driving control, the total value of the assistance correction amount $I_2^*$ and the automated driving control amount $I_3^*$ is held at a value equal to the value of the automated driving control amount $I_3^*$ immediately before intervention steering is performed by the driver. For example, while automated driving control assuming hands-free driving is executed, the vehicle is in balance with travel resistance. The automated driving control amount $I_3^*$ has a value that is in balance with travel resistance. Therefore, when the driver performs intervention steering while the vehicle is turning under automated driving control, holding the total value of the assistance correction amount $I_2^*$ and the automated driving control amount $I_3^*$ at a value equal to the value of the automated driving control amount $I_3^*$ immediately before intervention steering is performed by the driver can virtually equalize the steering feel of turning the steering wheel forward and the steering feel of turning it backward. This means an improvement in the steering feel that the driver experiences when performing intervention steering during execution of automated driving control.

Seventh Embodiment

Next, a seventh embodiment in which a steering control device is embodied as a control device of an EPS will be described. This embodiment differs from the above-described first embodiment in terms of the process executed by the microcomputer 50A.

The microcomputer 50A has a function of determining the driver's intentional intervention in steering during execution of automated driving control. The microcomputer 50A determines the driver's intervention in steering, for example, based on the steering torque $T_h$ detected through the torque sensor 51. When the driver turns the steering wheel 11 during execution of automated driving control, the microcomputer 50A sets PID gains (a proportional gain, an integral gain, and a differential gain) that are control parameters of PID control to values smaller than default values. Thus, the performance of adapting to the target value in PID control is reduced.

Figure 16:
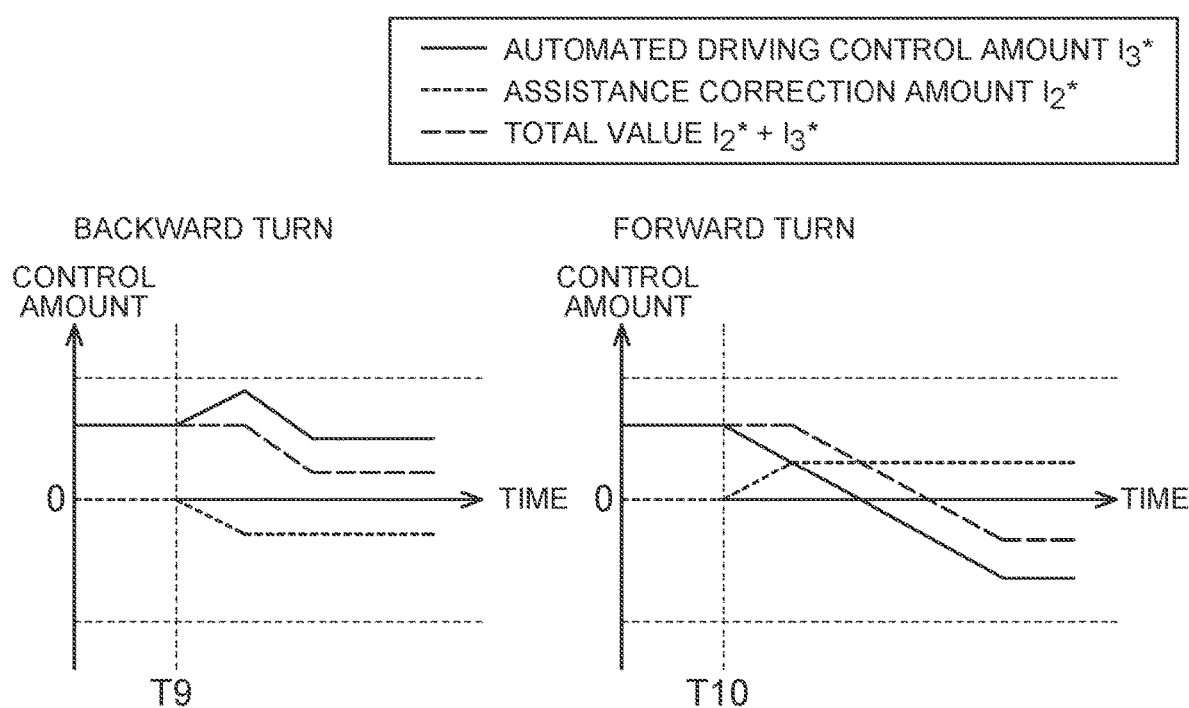
FIG. 16 is graphs, of which the left graph shows changes over time in the automated driving control amount and the assistance correction amount in the case of backward turn in a seventh embodiment of the steering control device, and the right graph shows changes over time in the automated driving control amount and the assistance correction amount in the case of forward turn.

As shown in the left graph of FIG. 16, when the vehicle is turning left under automated driving control and the driver turns the steering wheel 11 backward in the opposite direction (time T9), the absolute value of the automated driving control amount $I_3$* increases as the deviation of the rotation angle $θ_m$ of the motor 21 from the target angle $θ$* increases. Here, the PID gains have values set to be smaller than the default values during a time when the driver is turning the steering wheel 11 while automated driving control is executed. As the performance of adapting to the target angle $θ$* in PID control is reduced, the absolute value of the automated driving control amount $I_3$* is less likely to increase.

As shown in the right graph of FIG. 16, also when the vehicle is turning right under automated driving control and the driver turns the steering wheel 11 forward in the same direction (time T10), as in the case of backward turn, the performance of adapting to the target angle $θ$* in PID control is reduced, so that the absolute value of the automated driving control amount $I_3$* is less likely to increase.

Thus, the seventh embodiment can produce the following effect in addition to the effect of the above-described first embodiment: The PID gains have values set to be smaller than the default values during a time when the driver is performing intervention steering while automated driving control is executed. As the performance of adapting the actual rotation angle $θ_m$ to the target angle $θ$* in PID control is reduced, the absolute value of the automated driving control amount $I_3$* is less likely to increase. When the driver performs intervention steering while the vehicle is turning under automated driving control, the difference between the steering feel of turning the steering wheel forward and the steering feel of turning it backward is reduced. This means an improvement in the steering feel that the driver experiences when performing intervention steering during execution of automated driving control.

Eighth Embodiment

Next, an eighth embodiment in which a steering control device is embodied as a control device of an EPS will be described. This embodiment differs from the above-described first embodiment in terms of the configuration of the microcomputer 50A.

Figure 17:
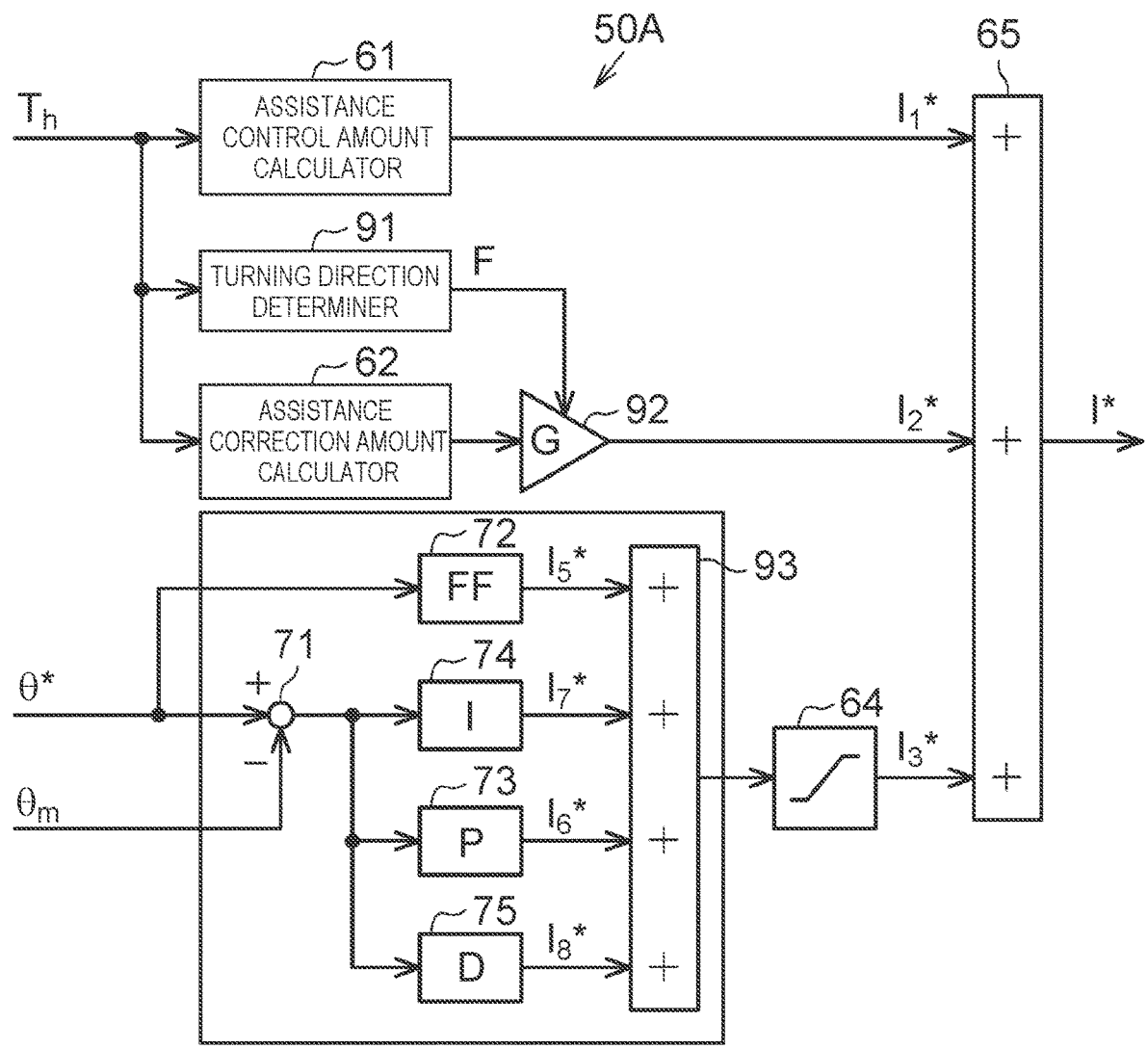
FIG. 17 is a block diagram of a microcomputer in an eighth embodiment of the steering control device.

As shown in FIG. 17, the microcomputer 50A has a turning direction determiner 91 and a gain multiplication unit 92 in addition to the assistance control amount calculator 61, the assistance correction amount calculator 62, the automated driving control amount calculator 63, the restriction processing unit 64, and the adder 65.

The turning direction determiner 91 determines the turning direction of the steering wheel 11 with reference to a neutral position thereof, for example, based on the steering torque $T_h$ detected through the torque sensor 51. The turning direction determiner 91 determines whether the turning state of the steering wheel 11 is a backward turning state or a forward turning state based on the turning direction, and sets the value of a flag F according to the determination result. When the turning direction determiner 91 determines that the turning state of the steering wheel 11 is a backward turning state, the turning direction determiner 91 sets the value of the flag F to "1". When the turning direction determiner 91 determines that the turning state of the steering wheel 11 is a forward turning state, the turning direction determiner 91 sets the value of the flag F to "0".

The gain multiplication unit 92 takes in the value of the flag F set by the turning direction determiner 91. The gain multiplication unit 92 multiplies the assistance correction amount $I_2$* calculated by the assistance correction amount calculator 62 by a gain G. The gain multiplication unit 92 changes the value of the gain G according to the value of the flag F. When the value of the flag F is "1", the gain multiplication unit 92 sets the gain G to a value smaller than "1". This is based on the objective of reducing the assistance correction amount $I_2$*. When the value of the flag F is "0", the gain multiplication unit 92 sets the gain G to "1".

The automated driving control amount calculator 63 has an adder 93 in addition to the subtractor 71, the feedforward controller 72, the proportional controller 73, the integral controller 74, and the differential controller 75 that are the same as those of the above-described third embodiment. The adder 93 calculates the automated driving control amount $I_3$* by summing the feedforward control amount $I_5$* calculated by the feedforward controller 72, the first feedback control amount $I_6$* calculated by the proportional controller 73, the second feedback control amount $I_7$* calculated by the integral controller 74, and the third feedback control amount $I_8$* calculated by the differential controller 75.

During backward turn that is likely to lead to a situation where only the automated driving control amount $I_3$* is restricted and only the assistance correction amount $I_2$* increases, the assistance correction amount $I_2$* calculated by the assistance correction amount calculator 62 is multiplied by the gain G having a value smaller than "1". Thus, the final assistance correction amount $I_2$* used in controlling the motor 21 has a value smaller than the original assistance correction amount $I_2$* corresponding to the steering torque $T_h$.

Thus, the eighth embodiment can produce the following effect: When the turning state of the steering wheel 11 is a backward turning state, the assistance correction amount $I_2$* calculated by the assistance correction amount calculator 62 is corrected to a value smaller than the original assistance correction amount $I_2$* corresponding to the steering torque $T_h$. Thus, during backward turn, a situation where only the automated driving control amount $I_3$* is restricted and only the assistance correction amount $I_2$* increases is less likely to arise. Therefore, when the driver performs intervention steering while the vehicle is turning under automated driving control, the steering feel of turning the steering wheel forward and the steering feel of turning it backward are virtually equalized. This means an improvement in the steering feel that the driver experiences when performing intervention steering during execution of automated driving control.

Other Embodiments

Each of the embodiments can be implemented with the following changes made thereto. In the embodiments, the EPS 10 of a type that applies an assistance force to the turning shaft 15 has been described as an example of where to apply the control device 50. However, the control device 50 may be applied to an EPS of a type that applies an assistance force to the steering shaft 13. As indicated by the long dashed double-short dashed lines in FIG. 1, the motor 21 is coupled to the steering shaft 13, for example, through the speed reduction mechanism 22. The pinion shaft 23 can be omitted.

Other Technical Ideas

Next, technical ideas that can be understood from the embodiments will be additionally described below. The target angle is a target value of the rotation angle ($\theta_m$) of the motor, the pinion angle ($\theta_p$) that is the rotation angle of the pinion shaft meshing with the turning shaft, or the turning angle ($\theta_s$) that is the rotation angle of the steering wheel.

What is claimed is:

1. A steering control device (50) that controls a motor that is a source of generation of an assistance force for assisting in turning a steering wheel, the steering control device (50) comprising:
   a first calculator (61) configured to calculate, according to a turning state, a first control amount for causing the motor to generate the assistance force;
   a second calculator (63) configured to calculate a second control amount for adapting an actual angle to a target angle that is convertible into a turning angle of the steering wheel and generated when a host control device intervenes in steering control; and
   a third calculator (62) configured to calculate, according to the turning state, a third control amount for offsetting the second control amount when the host control device intervenes in the steering control.

2. The steering control device (50) according to claim 1, further comprising a fourth calculator (64) that restricts a value of the second control amount calculated by the second calculator (63) to be within a specified allowable range.

3. The steering control device (50) according to claim 1, further comprising:
   a fifth calculator (66) configured to calculate a fourth control amount by summing the second control amount and the third control amount; and
   a sixth calculator (67) configured to restrict a value of the fourth control amount calculated by the fifth calculator (66) to be within a specified allowable range.

4. The steering control device (50) according to claim 1, wherein the second calculator (63) includes:
   a feedforward controller (72) configured to calculate a feedforward control amount through execution of feedforward control of adapting the actual angle to the target angle;
   a proportional controller (73) configured to calculate a first feedback control amount having a value proportional to a deviation of the actual angle from the target angle by executing proportional operation on the deviation;
   an integral controller (74) configured to calculate a second feedback control amount having a value proportional to an integral value of the deviation by executing integral operation on the deviation;
   a differential controller (75) configured to calculate a third feedback control amount having a value proportional to a differential value of the deviation by executing differential operation on the deviation;
   a first adder (76) configured to calculate a first additional value by summing the feedforward control amount and the second feedback control amount;
   a second adder (77) configured to calculate a second additional value by summing the first feedback control amount and the third feedback control amount;
   a first restriction processor (79A) configured to restrict the first additional value to be within a specified allowable range;
   a second restriction processor (79B) configured to restrict the second additional value to be within a specified allowable range; and
   a third adder (78) configured to calculate the second control amount as final by summing the first additional value having passed through the first restriction processor (79A) and the second additional value having passed through the second restriction processor (79B).

5. The steering control device (50) according to claim 1, wherein the second calculator (63) includes:
   a feedforward controller (72) configured to calculate a feedforward control amount through execution of feedforward control of adapting an actual angle to the target angle;
   a proportional controller (73) configured to calculate a first feedback control amount having a value proportional to a deviation of the actual angle from the target angle by executing proportional operation on the deviation;
   an integral controller (74) configured to calculate a second feedback control amount having a value proportional to an integral value of the deviation by executing integral operation on the deviation;
   a differential controller configured to calculate a third feedback control amount having a value proportional to a differential value of the deviation by executing differential operation on the deviation;
   a first adder configured to calculate a final feedback control amount by summing the first feedback control amount, the second feedback control amount, and the third feedback control amount;
   a first restriction processor configured to restrict the feedforward control amount to be within a specified allowable range;
   a second restriction processor configured to restrict the final feedback control amount to be within a specified allowable range; and
   a second adder configured to calculate the second control amount as final by summing the feedforward control amount having passed through the first restriction processor and the final feedback control amount having passed through the second restriction processor.

6. The steering control device according to claim 1, wherein the third calculator is configured to, when an absolute value of the second control amount has reached a limit value of a specified allowable range, hold the third control amount at a value at that point in time when the absolute value of the second control amount has reached the limit value of the specified allowable range.

7. The steering control device according to claim 1, wherein the steering control device is configured to, when the steering wheel is turned while the host control device is intervening in the steering control, adjust the second control amount and the third control amount such that a total value of the second control amount and the third control amount becomes equal to the second control amount immediately before the steering wheel is turned.

8. The steering control device according to claim 1, wherein the second calculator is configured to, when the steering wheel is turned while the host control device is intervening in the steering control, set values of a proportional gain, an integral gain, and a differential gain that are control parameters to values smaller than default values.

9. The steering control device according to claim 1, further comprising:
- a turning direction determiner that determines, based on a turning direction of the steering wheel, whether the turning state of the steering wheel is a backward turning state or a forward turning state; and
- a correction processing unit that, when the turning direction determiner determines that the turning state of the steering wheel is the backward turning state, corrects the third control amount calculated by the third calculator to a value smaller than the original third control amount corresponding to the turning state.

* * * * *